(12) United States Patent
Karube et al.

(10) Patent No.: US 10,166,896 B2
(45) Date of Patent: Jan. 1, 2019

(54) SEAT BELT ATTACHMENT STRUCTURE FOR OFF-ROAD VEHICLE

(71) Applicant: HONDA MOTOR CO., LTD., Minato-ku, Tokyo (JP)

(72) Inventors: Shinichi Karube, Florence, SC (US); Hironori Nozawa, Shiki (JP); Takeshi Kamiyama, Yoshikawa (JP); Yoshihiro Tano, Okegawa (JP)

(73) Assignee: Honda Motor Co., Ltd., Tokyo (JP)

( * ) Notice: Subject to any disclaimer, the term of this patent is extended or adjusted under 35 U.S.C. 154(b) by 482 days.

(21) Appl. No.: 14/867,344

(22) Filed: Sep. 28, 2015

(65) Prior Publication Data

US 2016/0090015 A1 Mar. 31, 2016

(30) Foreign Application Priority Data

Sep. 30, 2014 (JP) ................. 2014-199794

(51) Int. Cl.
*B60N 2/68* (2006.01)
*B60N 2/01* (2006.01)
(Continued)

(52) U.S. Cl.
CPC .............. *B60N 2/688* (2013.01); *B60N 2/012* (2013.01); *B60N 2/24* (2013.01); *B60N 2/38* (2013.01);
(Continued)

(58) Field of Classification Search
CPC .......... B60N 2/688; B60N 2/012; B60N 2/24; B60N 2/38; B60R 22/26
(Continued)

(56) References Cited

U.S. PATENT DOCUMENTS 3,961,807 A * 6/1976 Maki ....................... B60R 22/18
   280/807
5,494,316 A * 2/1996 Maesing ................. B60R 22/18
   280/808 X
(Continued)

FOREIGN PATENT DOCUMENTS

JP   2003-095062 A   4/2003
JP   2008-265471 A   11/2008
JP   2012-218659 A   11/2012

OTHER PUBLICATIONS

The notice of reasons for refusal from Japan Patent Office for Japanese patent application No. 2014-199794, dated Aug. 22, 2017. Machine translation attached.

*Primary Examiner* — Anthony D Barfield
(74) *Attorney, Agent, or Firm* — Honda Patents & Technologies North America, LLC; William R. Fisher

(57) ABSTRACT

A seat belt attachment structure for an off-road vehicle comprising a seat including a seat frame and at least two occupant sitting positions. A seat belt is provided for each sitting position that includes a shoulder belt, a waist belt, and a tongue plate. When fastened, the seat belt is fixed at three points including a retractor housing the shoulder belt, an anchor fixing the waist belt on the same side of the sitting position as the retractor, and a buckle positioned on the other side of the sitting position that detachably engages the tongue plate. At least a first appendage is positioned along the frame between the first and second sitting positions, and the waist belts of the first and second sitting positions are fixed to the first appendage when the seat belts of the first and second sitting positions are fastened.

21 Claims, 12 Drawing Sheets

(51) Int. Cl.
 *B60R 22/26* (2006.01)
 *B60N 2/38* (2006.01)
 *B60N 2/24* (2006.01)

(52) U.S. Cl.
 CPC ........ *B60R 22/26* (2013.01); *B60R 2022/263* (2013.01)

(58) Field of Classification Search
 USPC .................................................. 297/483, 248
 See application file for complete search history.

(56) References Cited

U.S. PATENT DOCUMENTS

| | | | |
|---|---|---|---|
| 5,575,533 A | 11/1996 | Glance | |
| 5,868,452 A * | 2/1999 | Grieger | 280/808 |
| 7,040,696 B2 * | 5/2006 | Vits | B60N 2/688 297/483 |
| 8,322,767 B2 | 12/2012 | Morita et al. | |
| 8,573,649 B2 * | 11/2013 | Baccelli | B60R 22/22 280/808 |
| 9,010,865 B2 * | 4/2015 | Valasin | B60N 2/688 297/483 |
| 9,475,413 B2 * | 10/2016 | Hayashi | B60N 2/688 |
| 2008/0309111 A1 | 12/2008 | Marriott et al. | |
| 2010/0194086 A1 | 8/2010 | Yamamura et al. | |

\* cited by examiner

SEAT BELT ATTACHMENT STRUCTURE FOR OFF-ROAD VEHICLE

The present application claims priority under 35 U.S.C. § 119 to Japanese Patent Application No. 2014-199794, filed Sep. 30, 2014, entitled "Seat Belt Attachment Structure For Off-Road Vehicle," the contents of which are incorporated herein by reference in their entirety.

TECHNICAL FIELD

The present disclosure relates to a seat belt attachment structure for an off-road vehicle.

BACKGROUND

Seat belts have a limited number of attachment positions for properly restraining an occupant. However, in vehicles equipped with a vehicle body frame configured from pipes or the like, the frame is not necessarily present at the position where a seat belt should be attached, and it is difficult to attach a seat belt at the appropriate position.

SUMMARY

In accordance with one embodiment, a seat belt attachment structure is provided for an off-road vehicle comprising a seat for a driver and at least one occupant, and a seat frame comprising a part of a vehicle body frame for supporting a seat cushion, a seat back, and seat belts for restraining occupants. The seat belts are fixed at three points when fastened including at retractors housing shoulder belts which are let out from behind a shoulder on one side of an occupant, anchors for fixing waist belts below the waist on the same side of the seat as the retractors, and buckles which connect the shoulder belts and the waist belts and with which tongue plates detachably engage below the waist on the opposite side of the anchors. The waist belts of two adjacent seats are fixed to an appendage positioned between the adjacent seats that extends upward from the seat frame.

In accordance with one embodiment, the waist belts of two adjacent seats are fixed to an appendage positioned between the seats that extends upward from a seat support part of the seat frame. As a result, since the waist belts are fixed to the appendage that extends upward from the seat support part of the seat frame, it is possible to extend the appendages to a given position at which occupants can be held comfortably, and the waist belts of two adjacent seats can be fixed to the same appendage. Therefore, a seat belt can be attached at any desired location with a simple and compact structure.

In accordance with one embodiment, one or more anchors and the buckles are provided with attachment plates that are attached to the appendage. A plurality of occupant sitting positions are provided in a horizontal row being so as to be shifted from one another from a side view of the vehicle, and the attachment plates of each of the seat belts of adjacent seats are fixed at different positions on the appendage from a side view of the vehicle.

In accordance with one embodiment, a plurality of occupant sitting positions are provided in a horizontal row so as to be shifted from one another from a side view of the vehicle, and the attachment plates of each of the seat belts are fixed at different positions on the appendages from a side view of the vehicle. Therefore, even in the case of two adjacent seats with different occupant sitting positions, an attachment plate of each seat belt for the adjacent sitting positions can be fixed to one appendage.

In accordance with one embodiment, the seat is a three-person seat on which three occupants can sit in a horizontal row and at least two appendages are provided. One appendage is provided to the left of a middle seat and the other appendage is provided to the right of the middle seat. Fastening members for fixing an attachment plate of the middle seat and an attachment member of the right seat are attached to the appendage on the right side of the middle seat and are fastened from the right side of the vehicle. Fastening members for fixing another attachment plate of the middle seat and an attachment plate of the left seat are attached to the appendage on the left side of the middle seat and are fastened from the left side of the vehicle.

In accordance with one embodiment, the fastening members for fixing the two attachment plates attached to the right side appendage are fastened from the right side of the vehicle, whereas the fastening member for fixing the two attachment plates attached to the left side appendage are fastened from the left side of the vehicle. Therefore, the attachment plates attached to the right side of the appendage can be fastened from the right side of the vehicle, and the attachment plates attached to the left side of the appendage can be fastened from the left side of the vehicle. This allows fastening from a convenient position which simplifies the assembly process.

In accordance with one embodiment, the appendages are provided with a hollow member having a rectangular cross section from the perspective of the axial direction. An attachment plate of a seat belt for a first seat is attached to one side in the vehicle width direction of the hollow member facing the first seat. An attachment plate of a seat belt for a second seat adjacent to the first seat is attached to the other side in the vehicle width direction of the hollow member facing the second seat.

In accordance with one embodiment, the attachment plate of the seat belt for the first seat is attached to one side in the vehicle width direction of the hollow member of the appendage facing the first seat, and the attachment plate of the seat belt for the second seat is attached to the other side in the vehicle width direction of the hollow member facing the second seat, so it is possible to use the tensile forces on both sides to counteract the torsional load acting on the hollow member when a seat belt is pulled, which makes it possible to prevent a large torsional load from acting on the hollow member.

In accordance with one embodiment, two nuts for fixing the attachment plates of the seat belts of two adjacent seats are provided on the appendage positioned therebetween, and one of the nuts is provided on a plate extending directly from one side surface in the vehicle width direction of the hollow member, whereas the other nut passes through the hollow member from left to right and is connected to both the left and right side surfaces of the hollow member.

In accordance with one embodiment, one of the nuts is provided on a plate extending directly from one side surface in the vehicle width direction of the hollow member, whereas the other nut passes through the hollow member from left to right and is connected to both the left and right side surfaces of the hollow member. As a result, it is possible to shift the positions of the two nuts in the vehicle width direction, which makes it easy to secure space for fixing each attachment plate to the same side of the appendage. In addition, the strength and rigidity of the hollow member can be enhanced by the nut connected to both side surfaces.

In accordance with one embodiment, the seat is a three-person seat on which three occupants sit in a horizontal row. One side surface in the vehicle width direction of the hollow member is an inside surface in the vehicle width direction. The attachment plate fixed to the other nut is fixed to the outside surface side of the hollow member, and the attachment plate fixed to the one nut is fixed to the outside surface side of the plate.

In accordance with one embodiment, the attachment plate fixed to the other nut is attached to the outside surface side of the hollow member, and the attachment plate fixed to the one nut is attached to the outside surface side of the plate. Therefore, it is possible to provide an attachment plate between the outside surface of the plate and the outside surface of the hollow member in a space-saving manner, and two attachment plates can be fixed to the appendages from the outside surface side.

In accordance with one embodiment, a seat belt attachment structure for an off-road vehicle includes a seat including a seat frame and at least a first occupant sitting position positioned adjacent a second occupant sitting position. Each occupant sitting position has opposing sides, a seat belt for each sitting position that is capable of being fastened and unfastened, each seat belt including a shoulder belt, a waist belt, and a tongue plate. When each seat belt is fastened it is fixed at three points including at a retractor housing the shoulder belt, at an anchor fixing the waist belt on the same side of the sitting position as the retractor, and at a buckle positioned on the other side of the sitting position that detachably engages the tongue plate when the seat belt is fastened. At least a first appendage extends upward from the seat frame and is positioned along the seat frame in the vehicle width direction between the first and second sitting positions. The seat belts of the first and second sitting positions are attached to the first appendage when the seat belts of the first and second sitting positions are fastened.

In accordance with one embodiment, a seat belt attachment structure for an off-road vehicle includes a seat support frame extending along a width of the vehicle, a first appendage extending from the support frame that includes an outer side facing away from a longitudinal centerline of the vehicle and an inner side facing toward the centerline, and a second appendage extending from the support frame that includes an outer side facing away from the centerline and an inner side facing toward the centerline and the inner side of the first appendage. A first sitting position is positioned along the frame outward from the centerline beyond the first appendage and includes a seat belt assembly that includes a belt with two ends, a tongue plate secured to the belt, a retractor secured to one end of the belt, an anchor secured to the other end of the belt and positioned on a first side of the first sitting position, and a buckle positioned on a second side of the first sitting position that is capable of detachably engaging the tongue plate. One of the buckle or the anchor for the first sitting position is fixed to the outer side of the first appendage. A second sitting position is positioned along the seat support frame adjacent the first seat and between the inner side of the first and second appendages, the second sitting position includes a seat belt assembly that includes a belt with two ends, a tongue plate secured to the belt, a retractor secured to one end of the belt, an anchor secured to the other end of the belt and positioned on a first side of the second sitting position, and a buckle positioned on a second side of the second sitting position that is capable of detachably engaging the tongue plate. One of the buckle or the anchor for the second sitting position is fixed to the outer side of the first appendage and the other of the buckle or the anchor is fixed to the outer side of the second appendage. A third sitting position is positioned along the frame adjacent the second sitting position and outward from the centerline beyond the second appendage. The second sitting position is positioned between the first and third sitting positions. The third sitting position includes a seat belt assembly that includes a belt with two ends, a tongue plate secured to the belt, a retractor secured to one end of the belt, an anchor secured to the other end of the belt and positioned on a first side of the third sitting position, and a buckle positioned on a second side of the third sitting position that is capable of detachably engaging the tongue plate. One of the buckle or the anchor for the third sitting position is fixed to the outer side of the second appendage.

In accordance with one embodiment, a seat belt attachment structure for an off-road vehicle includes a seat support frame extending along the width of the vehicle, a first appendage extending from the frame, and a second appendage extending from the frame. A first sitting position is positioned beside the first appendage and includes a seat belt assembly that includes a belt with two ends, a tongue plate secured to the belt, a retractor secured to one end of the belt, an anchor secured to the other end of the belt and positioned on a first side of the first sitting position, and a buckle positioned on a second side of the first sitting position that is capable of detachably engaging the tongue plate. One of the buckle or the anchor of the first sitting position is fixed to the first appendage. A second sitting position is positioned along the frame beside the first sitting position and between the first appendage and the second appendage. The second sitting position includes a seat belt assembly that includes a belt with two ends, a tongue plate secured to the belt, a retractor secured to one end of the belt, an anchor secured to the other end of the belt and positioned on a first side of the second sitting position, and a buckle positioned on a second side of the second sitting position that is capable of detachably engaging the tongue plate. One of the buckle or the anchor of the second sitting position is fixed to the first appendage and the other of the buckle or the anchor of the second sitting position is fixed to the second appendage. A third sitting position is positioned along the frame beside the second sitting position. The second sitting position is positioned between the first and third sitting positions, and the second appendage is positioned along the frame between the second sitting position and the third sitting position. The third sitting position includes a seat belt assembly that includes a belt with two ends, a tongue plate secured to the belt, a retractor secured to an end of the belt, an anchor secured to the other end of the belt that is positioned on a first side of the third sitting position, and a buckle positioned on a second side of the third sitting position that is capable of detachably engaging the tongue plate. One of the buckle or the anchor of the third sitting position is fixed to the second appendage. A seat back is provided that includes portions positioned behind the first, the second, and the third sitting positions. The portion of the seat back that is positioned behind the second sitting position is positioned closer to a front end of the vehicle than the other portions of the seat back positioned behind the first and the third sitting positions.

DETAILED DESCRIPTION

An embodiment of the present disclosure will be described hereinafter with reference to the drawings. In the explanations, the directional descriptions of front/rear, left/right, and upward/downward are the same as the directions with respect to the vehicle body unless specified otherwise. In addition, the symbol FR shown in each drawing indicates the front direction of the vehicle body, the symbol UP indicates the upward direction of the vehicle body, and the symbol LH indicates the left direction of the vehicle body.

Figure 1:
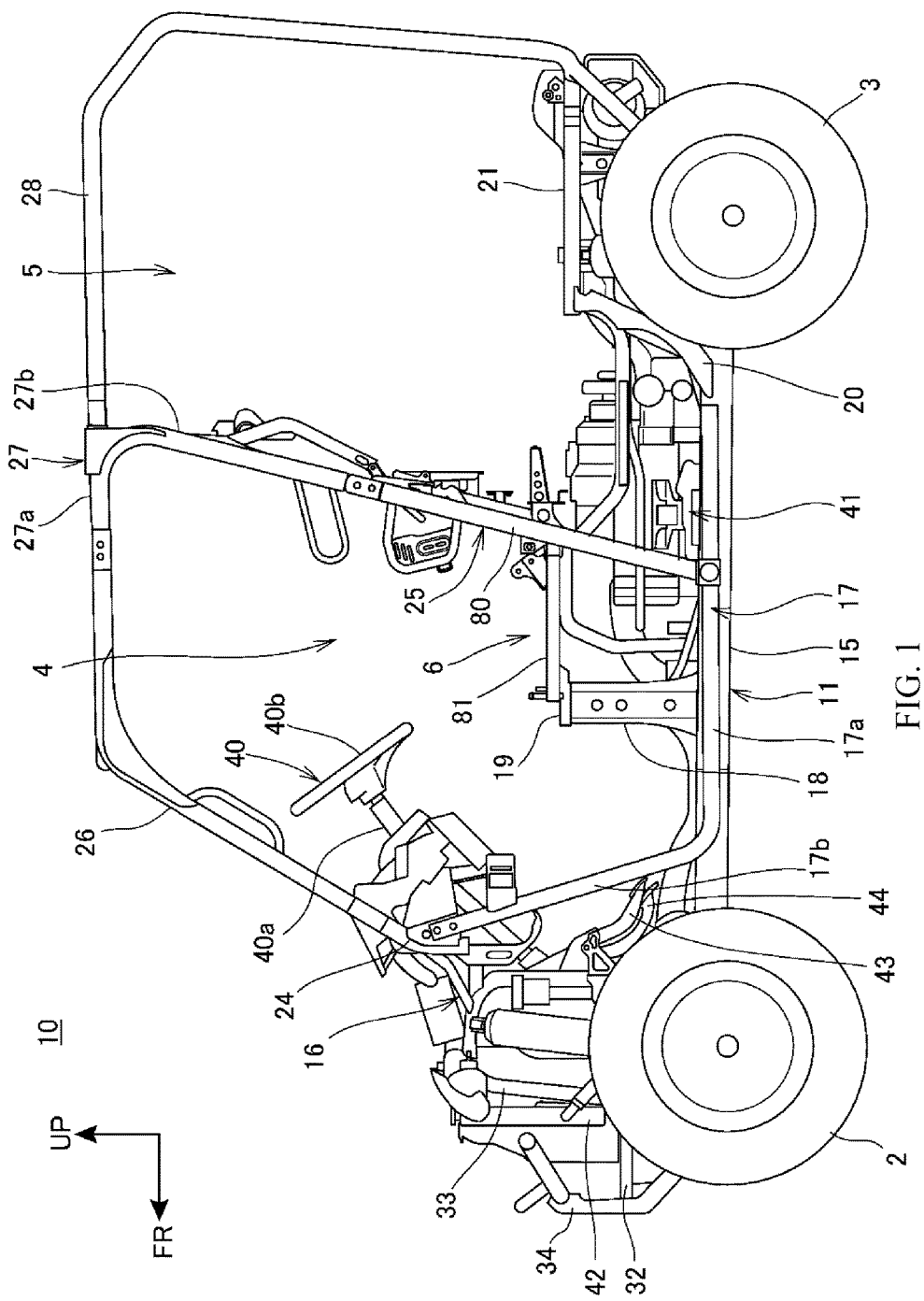
FIG. 1 is a left side view of an off-road vehicle of an embodiment of the present disclosure.
Figure 2:
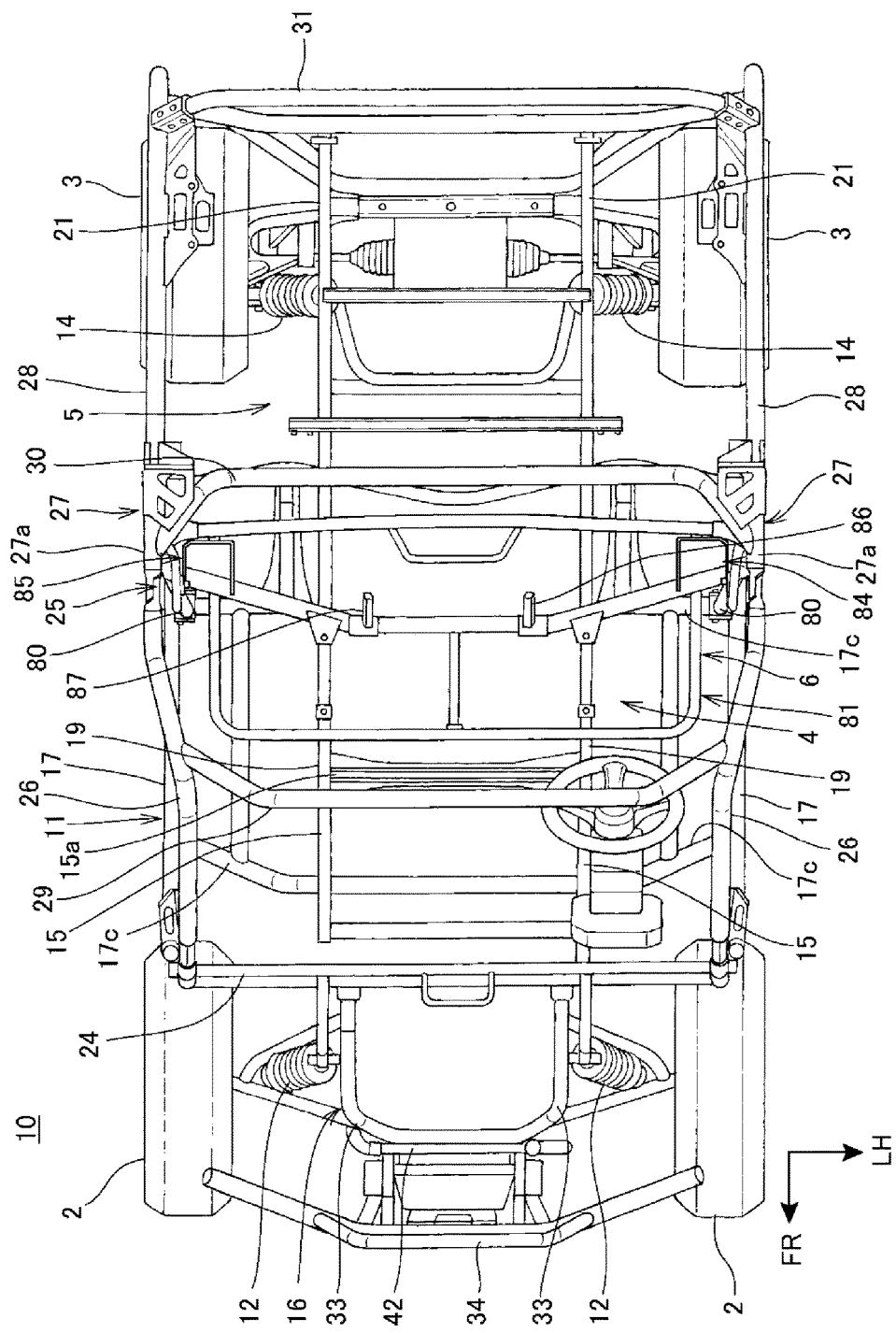
FIG. 2 is a plan view of an off-road vehicle.

FIG. 1 is a left side view of an off-road vehicle 10 of an embodiment of the present disclosure. FIG. 2 is a plan view of the off-road vehicle 10. Here, in FIGS. 1 and 2, the cushion of a seat 6 described below is not illustrated.

The off-road vehicle 10 may be a four-wheel-drive vehicle comprising a vehicle body frame 11 serving as a skeleton, a pair of left and right front wheels 2 supported on the front part of the vehicle body frame 11 via a front suspension 12, and a pair of left and right rear wheels 3 supported on the rear part of the vehicle body frame 11 via a rear suspension 14.

The off-road vehicle 10 may be provided with a vehicle body cover (not illustrated) which covers the vehicle body frame 11. The off-road vehicle 10 has a cabin 4 to be boarded by occupants on the front part and may have a trunk 5 or second row of seats (not shown) positioned behind the cabin 4. The cabin 4 is provided with a seat 6 in which an occupant sits. Doors (not illustrated) may be provided on the left and right sides of the cabin 4.

The vehicle body frame 11 may be formed by connecting pipe-shaped or plate-shaped frame members by means of welding, fastening, or the like.

The vehicle body frame 11 may be provided with a pair of left and right main frames 15 extending roughly horizontally from the vicinity of the front wheels 2 to the vicinity of the rear wheels 3 in the center in the vehicle width direction, a front frame 16 provided in front of the main frames 15, and a pair of left and right side frames 17 extending forward and backward on the outside of the left and right sides of the main frames 15.

The main frames 15 may be provided with a plurality of cross members 15a which connect the main frames 15 to one another.

Each side frame 17 may be provided with a side frame part 17a extending forward and backward along the main frames 15, a front side inclined frame part 17b which bends at the front end of the side frame 17a and extends forward and upward, and one or more side cross members 17c which connect the side frame 17a to the main frames 15.

The vehicle body frame 11 may be provided with a pair of left and right seat support frames 18 extending upward in a columnar shape from the front parts of the main frames 15, a pair of left and right upper main frames 19 extending backward along the main frames 15 from the upper ends of the seat support frames 18, and a pair of left and right rear side inclined frame parts 20 which extend upward and backward from the rear parts of the main frames 15 and are connected to the rear ends of the upper main frames 19.

The vehicle body frame 11 may be provided with a pair of left and right rear upper main frames 21 extending forward and backward to the inside of the rear wheels 3. The front ends of the rear upper main frames 21 are connected to the upper ends of the rear side inclined frame parts 20.

The vehicle body frame 11 may be provided with a front side cross frame 24 which connects the upper ends of the front side inclined frame parts 17b in the vehicle width direction and a seat frame 25 extending upward from the side frames 17 in the center of the front and rear sides of the off-road vehicle 10.

The vehicle body frame 11 may be provided with a pair of left and right front pillars 26 which extend upward and to the rear from both ends in the vehicle width direction of the front side cross frame 24 and then bend and extend roughly horizontally to the rear, and a pair of left and right middle pillars 27 connected to the rear ends of the front pillars 26. Each of the middle pillars 27 is provided with a horizontal part 27a extending roughly horizontally to the rear from the rear ends of the front pillars 26, and a pillar part 27b which bends at the rear end of the horizontal part 27a and extends downward and to the front. The lower ends of the pillar parts 27b are connected to the seat frame 25.

The vehicle body frame 11 may be provided with a pair of left and right rear pillars 28 which extend to the rear end part of the vehicle from the middle pillars 27 and then bend and extend downward before being connected to the rear upper main frames 21 and the like.

The vehicle body frame 11 may be provided with a front cross member 29 which connects the front pillars 26 in the vehicle width direction, a middle cross member 30 which connects the middle pillars 27 in the vehicle width direction, and a rear cross member 31 which connects the rear pillars 28 in the vehicle width direction.

The front frame 16 may be provided with a forward projecting part 32 extending forward from the front end parts of the main frames 15, a pair of left and right suspension support frame parts 33 extending upward from the forward projecting part 32, and a bumper 34 extending upward from the front end of the forward projecting part 32. The upper parts of the suspension support frame parts 33 are connected to the front side cross frame 24.

A steering mechanism 40 for steering the front suspension 12 and the front wheels 2, a radiator 42 for dissipating the heat of cooling water of an engine 41, a brake pedal 43, and an acceleration pedal 44 may be provided on the front frame 16 side.

The steering mechanism 40 may be provided with a steering shaft 40a rotatably supported on the vehicle body frame 11 and a steering wheel 40b attached to the upper end part of the steering shaft 40a.

The engine 41 serving as a power unit may be disposed to the lower rear of the seat 6. In a non-limiting example, the engine 41 is supported on the main frames 15 and is positioned in back of the seat support frames 18 and below the upper main frames 19.

The engine 41 may be provided with a transmission (not illustrated) on the rear part, and the motive power of the engine 41 is transmitted to the rear wheels 3 via a pair of left and right drive shafts (not illustrated) which connect the transmission to the rear wheels 3.

Figure 3:
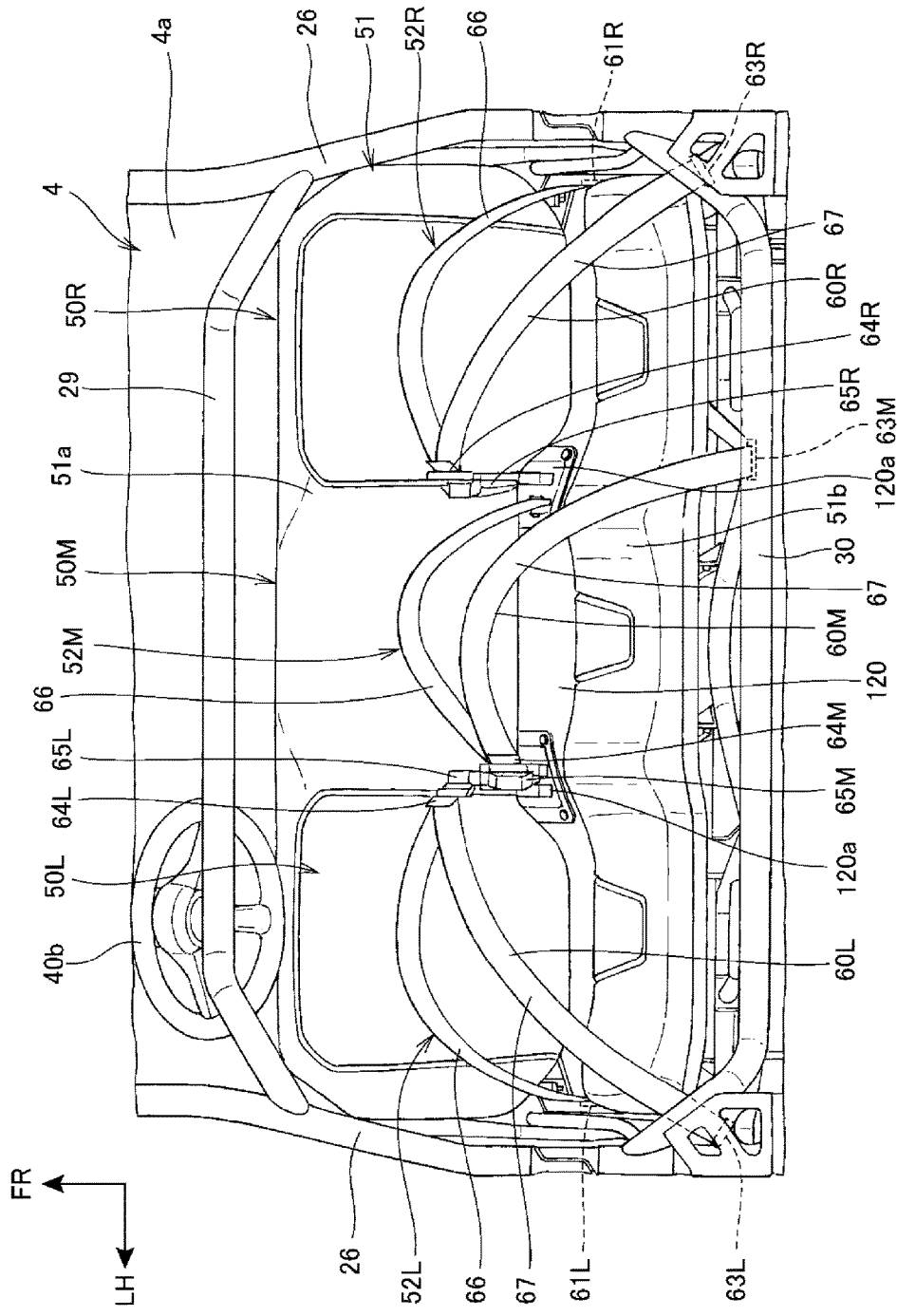
FIG. 3 is a plan view of the peripheral parts of a seat when viewed from above.
Figure 4:
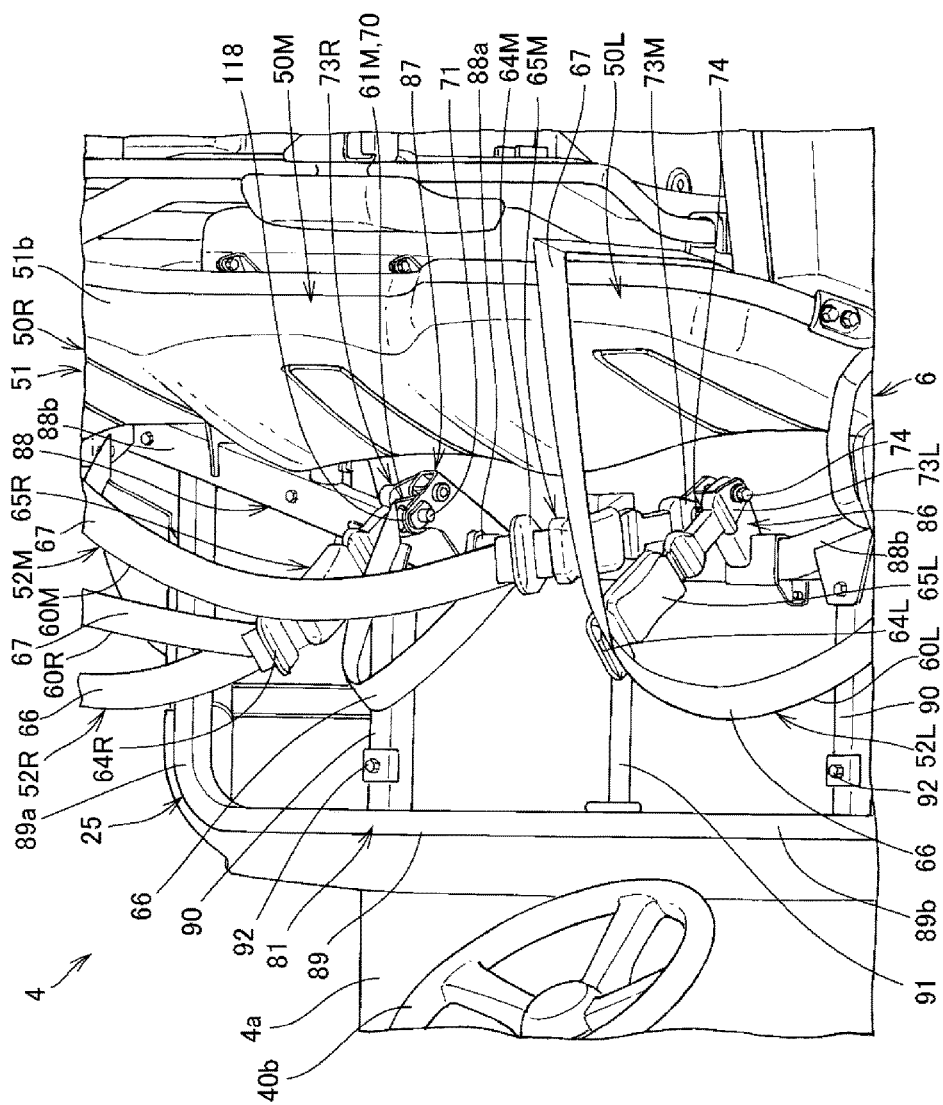
FIG. 4 is a perspective view of the peripheral parts of a seat.

FIG. 3 is a plan view of the peripheral parts of the seat 6 when viewed from above. FIG. 4 is a perspective view of the peripheral parts of the seat 6 wherein the seat cushion 51a of the seat 6 has been removed.

In a non-limiting example, the seat 6 is a so-called bench seat that extends in the vehicle width direction, and three occupants can sit in a row in the vehicle width direction. Specifically, the seat 6 is provided with a side seat 50L serving as a driver's seat positioned on one side (left side) in the vehicle width direction, another side seat 50R on the other side (right side) in the vehicle width direction, and a middle seat 50M between the one side seat 50L and the other side seat 50R. The driver is, of course, an occupant.

The seat 6 is provided with a seat frame 25, a cushion 51, and seat belt devices 52L, 52M, and 52R (seat belts) respectively provided on the one side seat 50L, the middle seat 50M, and the other side seat 50R.

The cushion 51 is provided with a seat cushion 51a on which an occupant sits and a backrest 51b (seatback) which supports the back of the occupant. The seat cushion 51a and the backrest 51b may be respectively rectangular cushions formed integrally for three people and are formed so as to be longer in the vehicle width direction than in the front/rear directions. It is to be understood, however, that the seat cushion 51a and backrest 51b are not limited to such configurations. For example, the seat cushion 51a and backrest 51b could be separate components forming three distinct seats 50L, 50M, 50R.

As best shown in FIG. 3, the portion of the backrest 51b for the middle seat 50M bulges forward toward the front of the vehicle 10 a greater degree than the portions of the backrest 51b for the side seat 50L and the side seat 50R. In addition, the portion of the seat cushion 51a for the middle seat 50M may bulge upward to a greater degree than the portions of the seat cushion 51a for the side seats 50L and 50R. As a result, the occupant of the middle seat 50M may sit further forward and upward than the occupants of the side seats 50L and 50R, so the shoulder of the occupant of the middle seat 50M is unlikely to get in the way of the shoulders of the occupants of the side seats 50L and 50R, and the comfort of the occupants of the seat 6 is enhanced.

As shown in the top view of FIG. 3, the front edge part of the seat cushion 51a extends roughly straight in the vehicle width direction, but the rear edge part of the seat cushion 51a is recessed forward at the middle seat 50M portion, and the middle seat 50M portion of the seat cushion 51a is smaller in the forward and backward directions than the side seat 50L portion and the side seat 50R portion of the seat cushion 51a.

The cabin 4 is provided with a floor 4a where the occupants rest their feet to the front and below the seat 6.

Figure 5:
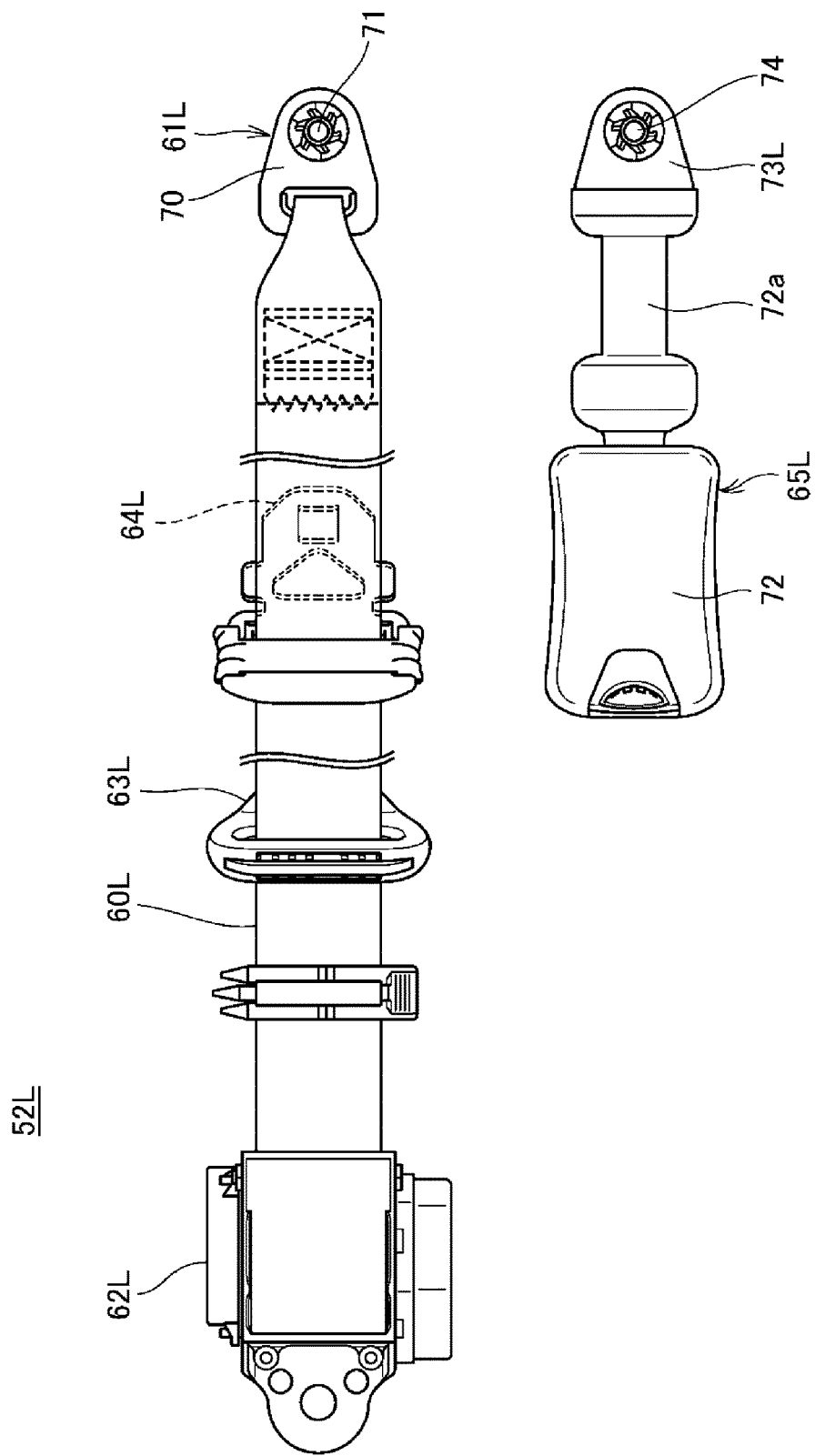
FIG. 5 illustrates a seat belt device.

FIG. 5 illustrates the seat belt device 52L. Although not shown, the seat belt devices 52M and 52R are configured in the same manner as device 52L in FIG. 5.

As illustrated in FIGS. 3 to 5, the respective seat belt devices 52L, 52M, and 52R are provided with belt-shaped belt main units 60L, 60M, and 60R, anchors 61L, 61M, and 61R for fixing one end of the belt main units 60L, 60M, and 60R to the seat frame 25, retractors 62L, 62M, and 62R (62M and 62R are not illustrated) which windably support the belt main units 60L, 60M, and 60R, shoulder anchors 63L, 63M, and 63R over which the belt main units 60L, 60M, and 60R are wound at positions above the seat 6, tongue plates 64L, 64M, and 64R provided at intermediate positions of the belt main units 60L, 60M, and 60R, and buckles 65L, 65M, and 65R which are attached to the seat frame 25 and to which the tongue plates 64L, 64M, and 64R are connected when the seat belt devices 52L, 52M, and 52R are fastened.

The belt main units 60L, 60M, and 60R of the respective seat belt devices 52L, 52M, and 52R are secured to the vehicle body side at three points when the seat belt devices 52L, 52M, and 52R are fastened including the anchors 61L, 61M, and 61R, the retractors 62L, 62M, and 62R, and the buckles 65L, 65M, and 65R.

The anchors 61L, 61M, and 61R may be provided with an attachment plate 70 to which the belt main units 60L, 60M, and 60R are connected and an anchor support bolt 71 (fastening member) which is inserted into the attachment plate 70 and fastened to the seat frame 25. The anchors may be positioned on the same side of the seats 50L, 50M, 50R as the respective retractor 62L, 62M, and 62R. It is to be understood that the location of the anchors 61L, 61M, and 61R is not limited to those shown in the drawings and that the anchors 61L, 61M, and 61R can be positioned on either side of the respective seat 50L, 50M, and 50R in any combination.

The buckles 65L, 65M, and 65R are respectively provided with a buckle main unit 72 into which the tongue plates 64L, 64M, and 64R are inserted and connected, an arm 72a extending from the buckle main unit 72, buckle attachment plates 73L, 73M, and 73R (attachment plates) provided at the tip of the arm 72a, and a buckle support bolt 74 (fastening member) which is inserted into the buckle attachment plates 73L, 73M, and 73R and is fastened to the seat frame 25. It is to be understood that the location of the buckles 65L, 65M, and 65R is not limited to those shown in the drawings and that the buckles 65L, 65M, and 65R can be positioned on either side of the respective seat 50L, 50M, and 50R in any combination. It is to be understood that the location of the buckles 65L, 65M, and 65R is not limited to those shown in the drawings and that the buckles 65L, 65M, and 65R can be positioned on either side of the respective seat 50L, 50M, and 50R in any combination.

One end of the belt main units 60L, 60M, and 60R is housed in each of the retractors 62L, 62M, and 62R, and when the belt main units 60L, 60M, and 60R are pulled to one end side, the belt main units 60L, 60M, and 60R are pulled out of the retractors 62L, 62M, and 62R. The retractors 62L, 62M, and 62R may be fixed to the vehicle body frame 11 below the cushion part 51, for example. It is to be understood that the location of the retractors 62L, 62M, and 62R is not limited to those shown in the drawings and that the retractors 62L, 62M, and 62R can be positioned on either side of the respective seat 50L, 50M, and 50R in any combination.

The shoulder anchors 63L, 63M, and 63R are disposed above the backrest part 51b on the same side as the anchors 61L, 61M, and 61R and the retractors 62L, 62M, and 62R in the vehicle width direction—that is, above the shoulders on one side of the occupants—and are supported on the vehicle body frame 11. The shoulder anchors 63L, 63M, and 63R guide the pullout and windup operations of the belt main units 60L, 60M, and 60R.

The buckles 65L, 65M, and 65R and the anchors 61L, 61M, and 61R are provided in front of the lower part of the backrest 51b and to the rear of the seat cushion 51a. The buckles 65L, 65M, and 65R are provided on the opposite side of the seats 50L, 50M, and 50R as the anchors 61L, 61M, and 61R in the width direction of each seat 50L, 50M, and 50R so as to straddle the sitting position of each seat 50L, 50M, and 50R.

The tongue plates 64L, 64M, and 64R are loosely fitted into the belt main units 60L, 60M, and 60R so as to be movable over the belt main units 60L, 60M, and 60R. In the fastened seat belt state, the tongue plates 64L, 64M, and 64R are engaged with the buckles 65L, 65M, and 65R positioned on the opposite side as the anchors 61L, 61M, and 61R in the width direction of each seat 50L, 50M, and 50R.

When the seat belt devices 52L, 52M, and 52R are not in use, parts of the belt main units 60L, 60M, and 60R are wound into the retractors 62L, 62M, and 62R and are disposed linearly between the anchors 61L, 61M, and 61R and the shoulder anchors 63L, 63M, and 63R. The belt main units 60L, 60M, and 60R assume the fastened seat belt state when the belt main units 60L, 60M, and 60R are pulled out of the retractors 62L, 62M, and 62R and the tongue plates 64L, 64M, and 64R are connected to the buckles 65L, 65M, and 65R.

In the fastened seat belt state, the respective waist belts 66 between the anchors 61L, 61M, and 61R and the tongue plates 64L, 64M, and 64R in the seat belt devices 52L, 52M, and 52R restrain the waist region of the occupants, and the respective shoulder belts 67 between the tongue plates 64L, 64M, and 64R and the shoulder anchors 63L, 63M, and 63R restrain the chest region of the occupants diagonally from shoulder to waist. The shoulder belts 67 are guided over the upper ends of the shoulder anchors 63L, 63M, and 63R and are let out from behind the shoulders on one side of the occupants.

That is, the waist belts 66 and the shoulder belts 67 are separated by the tongue plates 64L, 64M, and 64R, and the tongue plates 64L, 64M, and 64R can be considered to connect the waist belt parts 66 and the shoulder belt parts 67.

The anchors 61L, 61M, and 61R, the retractors 62L, 62M, and 62R, and the buckles 65L, 65M, and 65R are positioned to the left and right sides of the sitting positions (seats 50L, 50M, and 50R). In a non-limiting example, the anchor 61L and the shoulder anchor 63L are provided on the outer side of the side seat 50L, and the buckle 65L is provided on the inner side of the side seat 50L.

In the other side seat 50R, the anchor 61R and the shoulder anchor 63R are provided on the outer side of the side seat 50R, and the buckle 65R is provided on the inner side of the side seat 50R. In the middle seat 50M, the anchor 61M is provided near the buckle 65R of the side seat 50R, and the buckle 65M is provided near the buckle 65L of the side seat 50L. In addition, the shoulder anchor 63M of the middle seat 50M is provided above the anchor 61M.

Figure 6:
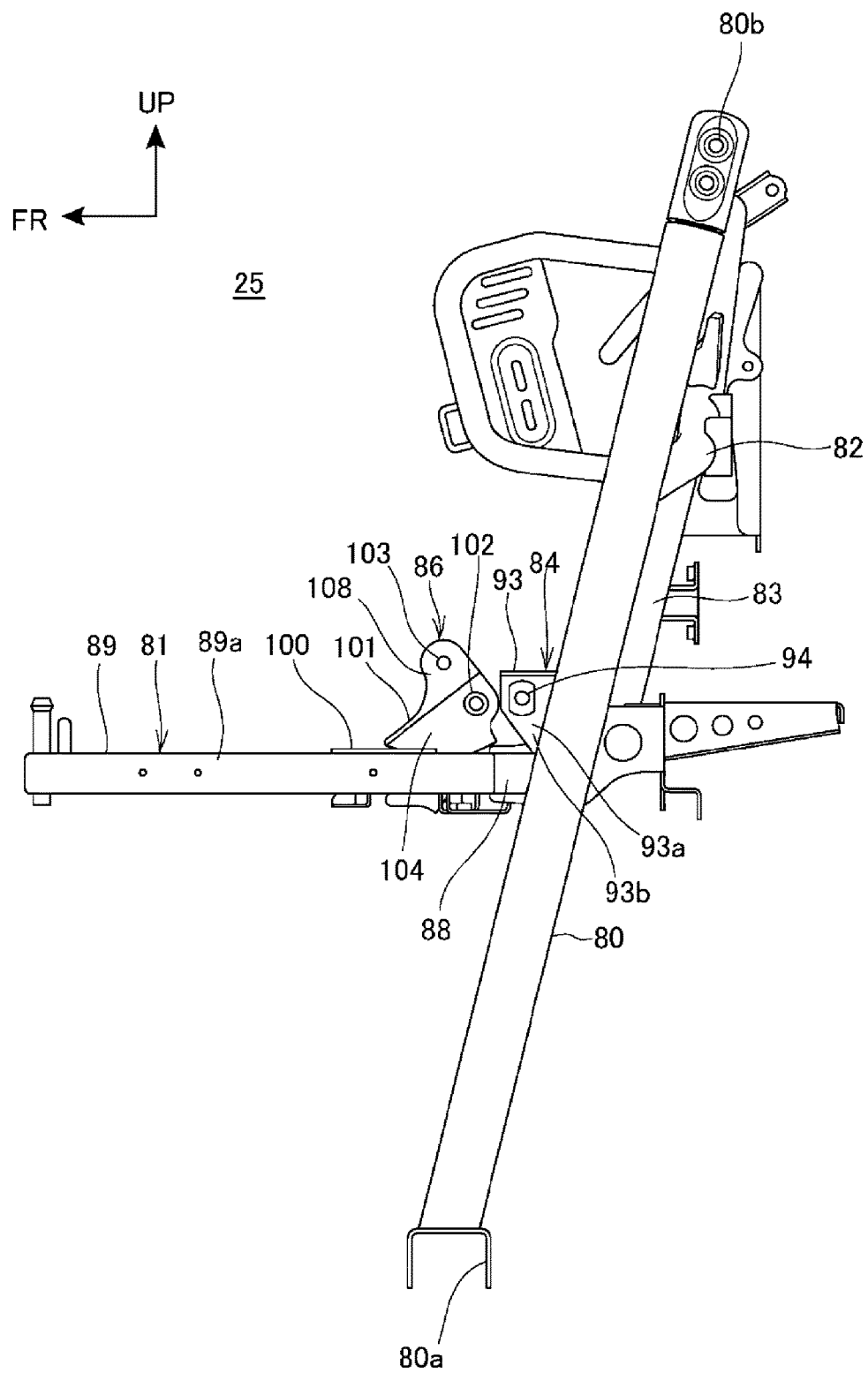
FIG. 6 is a left side view of a seat frame.
Figure 7:
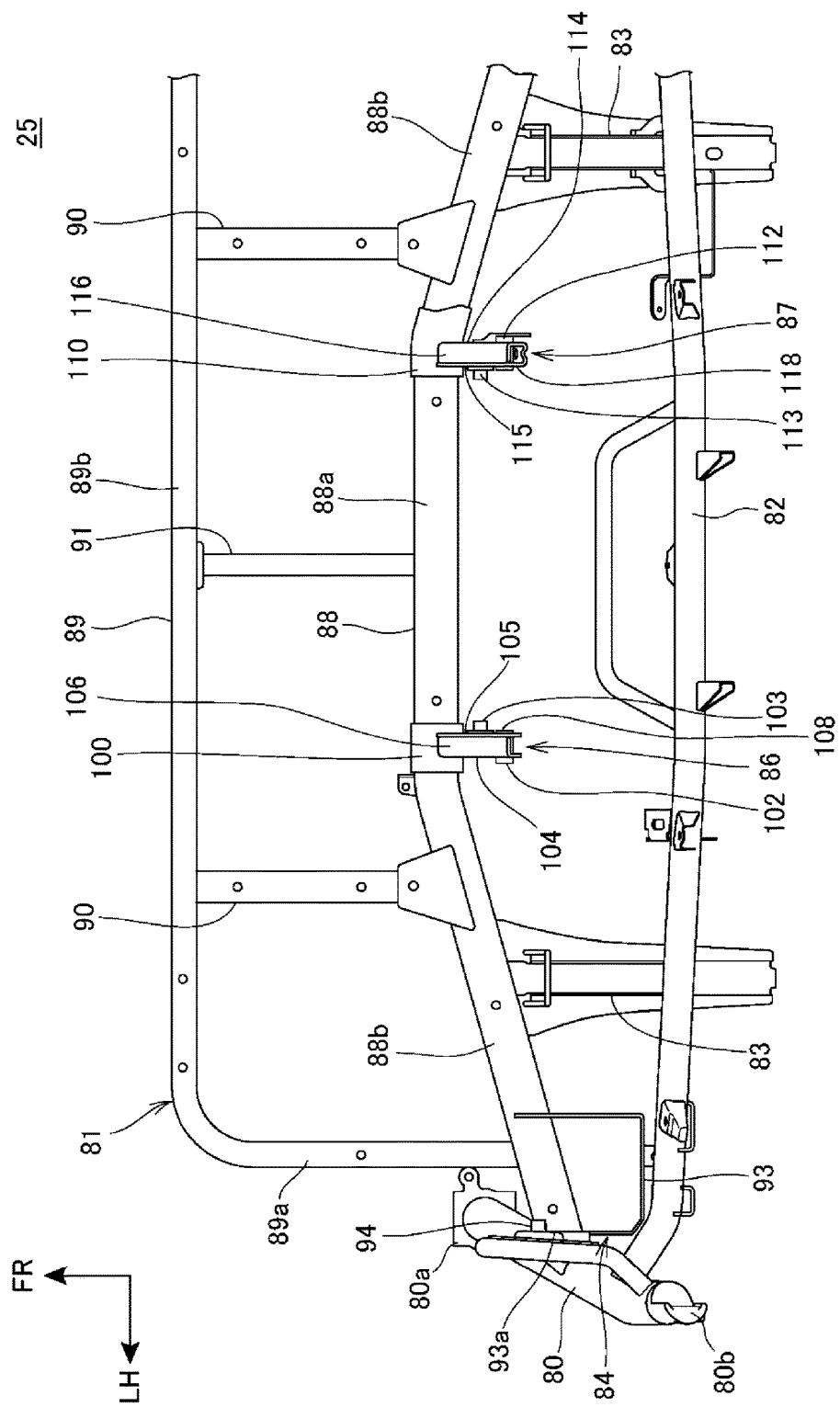
FIG. 7 is a plan view of the seat frame when viewed from above.
Figure 8:
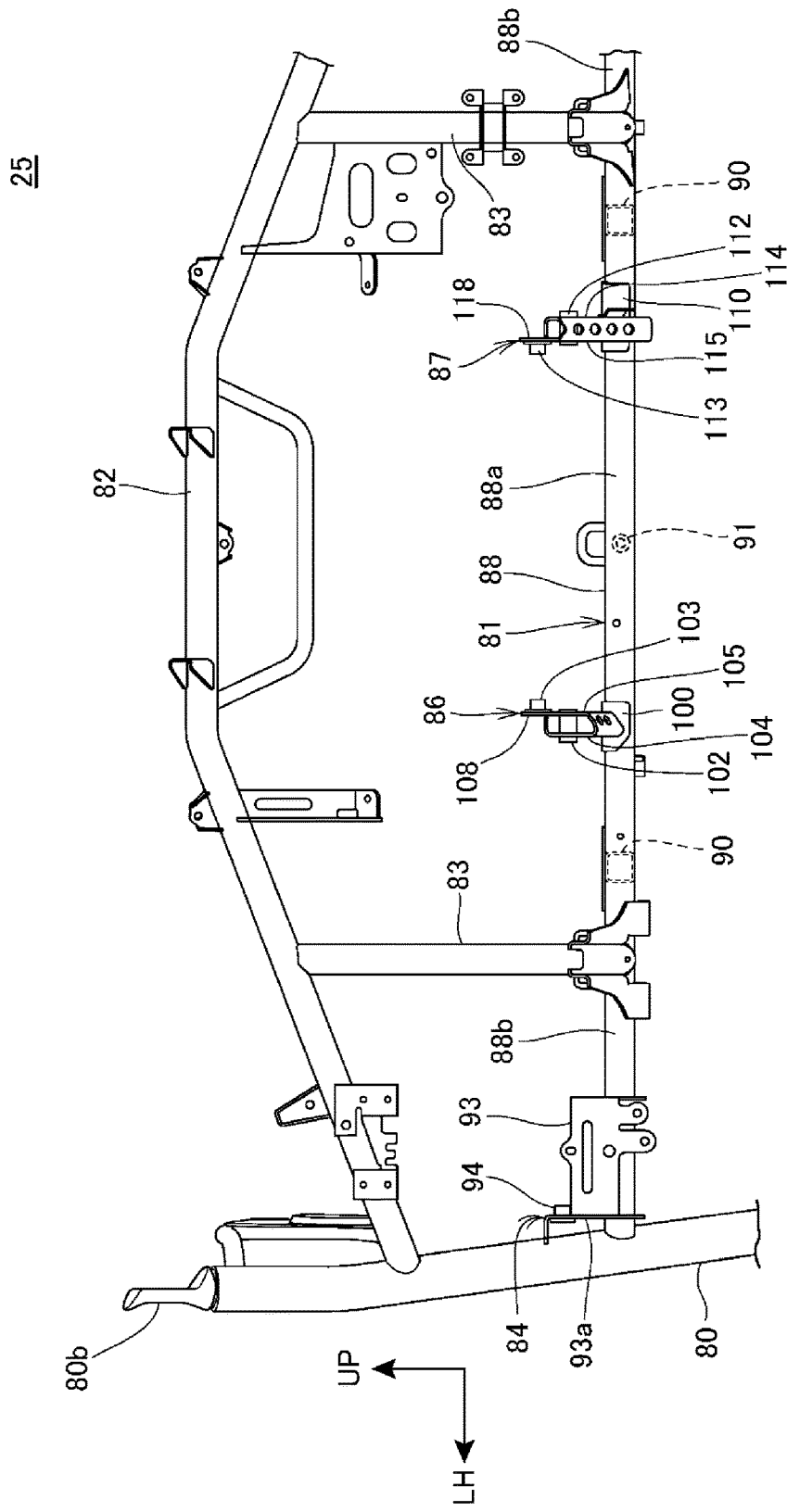
FIG. 8 is a front view of the seat frame when viewed from behind.
Figure 9:
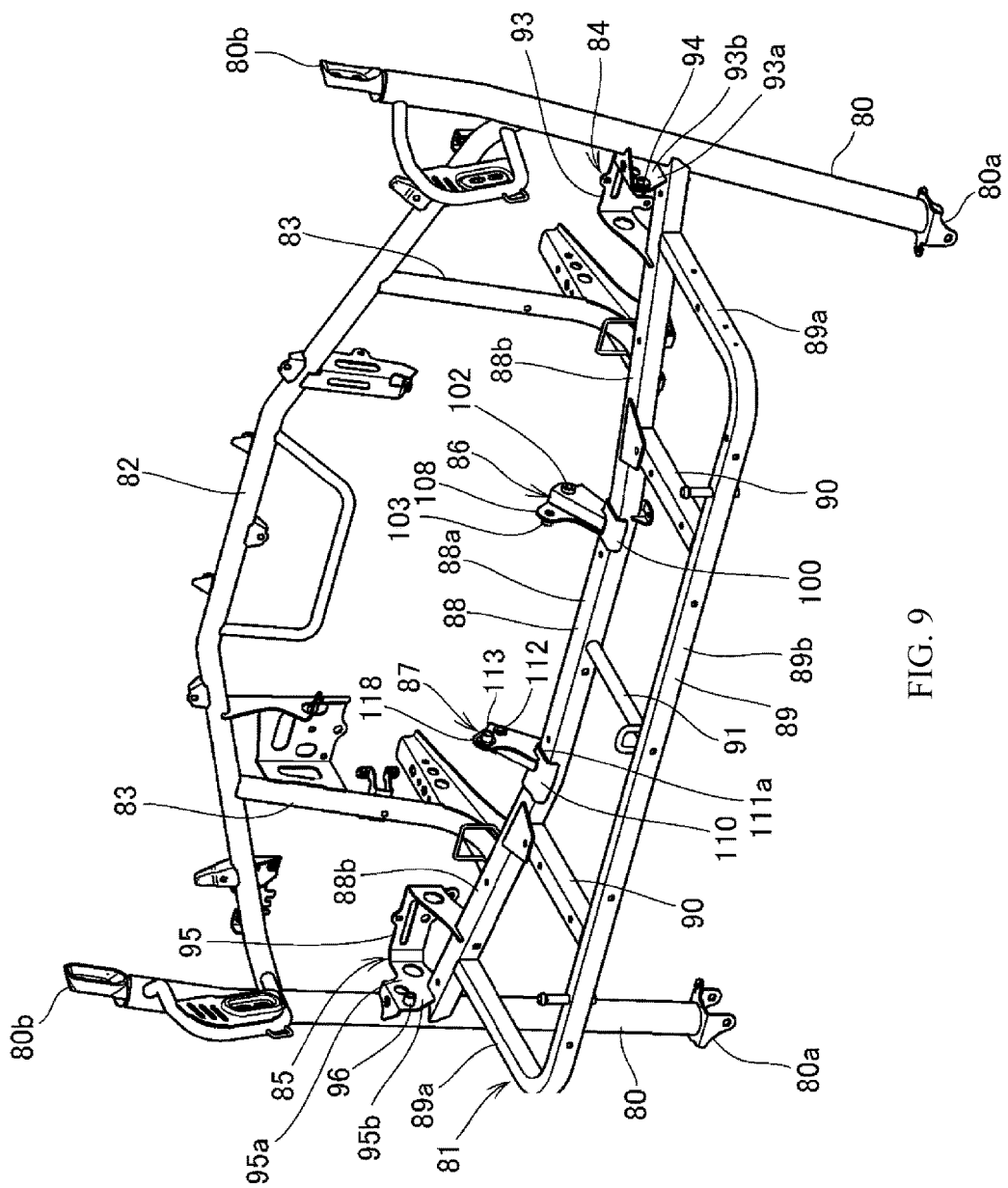
FIG. 9 is a perspective view of the seat frame.

FIG. 6 is a left side view of the seat frame 25. FIG. 7 is a plan view of the seat frame 25 when viewed from above. FIG. 8 is a view from behind the seat frame 25 looking forward. FIG. 9 is a perspective view of the seat frame 25. Referring to FIGS. 6 to 9, the seat frame 25 may be provided with a pair of left and right column parts 80 extending upward from the side frames 17 (FIG. 1), a seat support frame 81 which connects the column parts 80 in the vehicle width direction, an upper cross frame part 82 which connects the column parts 80 in the vehicle width direction above the seat support 81, and a pair of left and right vertical connection frame parts 83 which connect the upper cross frame part 82 and the seat support 81 vertically.

The seat frame 25 may be provided with a support 84 for the anchor 61L or the buckle 65L and another support 85 for the anchor 61R or the buckle 65R.

The seat frame 25 is provided with a first appendage 86 for supporting, for example, the buckle 65M and the buckle 65L and a second appendage 87 for supporting, for example, the anchor 61M and the buckle 65R.

The column parts 80 may be round pipe-shaped frames disposed so as to incline to the rear along the backrest 51b from a side perspective. The column parts 80 are respectively provided with a lower end connection part 80a fastened to the side cross member 17c of each side frame 17 and an upper end connection part 80b fastened to the lower end of the pillar part 27b of each middle pillar 27.

The seat support 81 is provided roughly horizontally in order to support the seat cushion 51a from below. The seat support 81 is provided with a cross member 88 which extends between the upper and lower ends of the column parts 80 in the vehicle width direction, and a frame member 89 positioned forward of the cross member 88.

The cross member 88 is provided with a middle part (center portion) 88a extending roughly straight in the vehicle width direction, and a pair of left (first leg) and right (second leg) inclined parts 88b which bend toward the ends of the middle part 88a. The left and right parts 88b extend from the ends of the middle part 88a to the outside in the vehicle width direction, and the ends of the left and right parts 88b are connected to the column parts 80. The cross member 88 may be a pipe with a roughly rectangular cross section.

Left and right side parts 89a extend forward from the inclined parts 88b along the outside in the vehicle width direction, and another cross member 89b links the front ends of the side parts 89a. The cross member 89b is positioned parallel to the middle part 88a. The frame member 89 may be an angular pipe with a roughly rectangular cross section.

The seat support frame 81 may be provided with a pair of left and right connection parts 90 extending between the cross member 89b and the inclined parts 88b, and a center connection 91 extending between the cross member 89b and the middle part 88a.

The inclined parts 88b and the connection parts 90 are respectively positioned below the side seat 50L and the side seat 50R, and the middle part 88a and the center connection 91 are positioned below the middle seat 50M. The middle part 88a is aligned with the middle seat 50M where the backrest 51b bulges forward so that the middle part 88a is positioned farther forward than the inclined parts 88b.

In a non-limiting example, the seat frame 25 is connected integrally to the vehicle body frame 11 as a result of the seat support 81 being mounted on the upper main frames 19 (FIG. 1) and the lower end connection 80a and the upper end connection 80b of the column parts 80 being fastened. Specifically, the seat frame 25 is fastened to the upper main frames 19 by a plurality of bolts 92 (FIG. 4) inserted into the connection parts 90 of the seat support frame 81.

The support (appendage) 84 is provided near the column 80 on the side seat 50L side and is welded to the inclined part 88b of the cross member 88. The support 84 is provided with a roughly C-shaped bracket 93 formed so as to bend the plate material, and a cylindrical support tube 94 is supported on the bracket 93.

The bracket 93 is disposed on the upper surface of the inclined part 88b so that the C-shaped open part faces the forward end of the vehicle, and the support tube 94 is provided on an outer plate 93a of the bracket 93. The outer plate 93a has a forward projection 93b which is disposed near the inside surface of the column 80 and extends further forward than the column 80, and the support tube 94 is inserted into a through-hole formed in the forward projection 93b and is welded to the through-hole.

The support tube 94 is a tubular nut member extending in the vehicle width direction and is provided with a female screw threading on the inner periphery. In a non-limiting example, the anchor 61L is disposed on the outer surface side of the outer plate 93a and is fixed to the support 84 with the anchor support bolt 71 (FIG. 5) being fastened to the support tube 94 from the outside as shown in FIG. 6. The anchor 61L can rotate around the anchor support bolt 71. Although the present disclosure describes fixing the anchor 61L to the support tube 94, it is to be understood that the buckle 65L may be fixed to the support tube 94 with the buckle support bolt 74.

The other support (appendage) 85 is provided near the column 80 on the seat 50R side and is welded to the inclined part 88b of the cross member 88. The support 85 is provided with a roughly C-shaped bracket 95 formed so as to bend the plate material, and a cylindrical support tube 96 is supported on the bracket 95.

The bracket 95 is disposed on the upper surface of the inclined part 88b so that the C-shaped open part faces the forward end of the vehicle, and the support tube 96 is provided on an outer plate 95a of the bracket 95. Specifically, the outer plate 95a has a forward projection 95b which is disposed near the inside surface of the column 80 and extends further forward than the column part 80, and the support tube 96 is inserted into a through-hole formed in the forward projection 95b and is welded to the through-hole.

The support tube 96 is a tubular nut member extending in the vehicle width direction and is provided with a female screw threading on the inner periphery. In a non-limiting example, the anchor 61R is disposed on the outer surface side of the outer plate 95a and is fixed to the side support 85 as a result of the anchor support bolt 71 (FIG. 5) being fastened to the support tube 96 from the outside. The anchor 61R can rotate around the anchor support bolt 71. Although the present disclosure describes fixing the anchor 61R to the support tube 96, it is to be understood that the buckle 65R may be fixed to the support tube 94 with the buckle support bolt 74.

Figure 10:
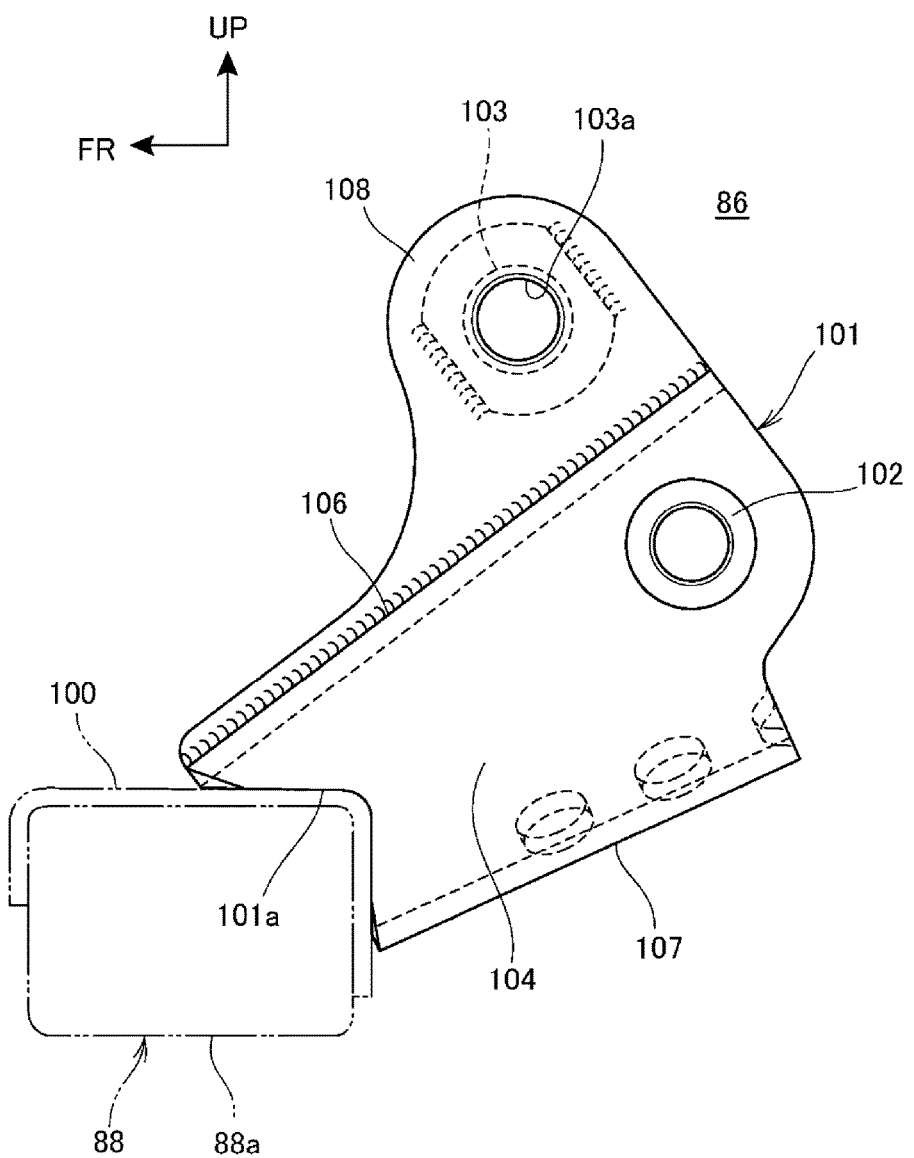
FIG. 10 is a left side view of an appendage on one side.
Figure 11:
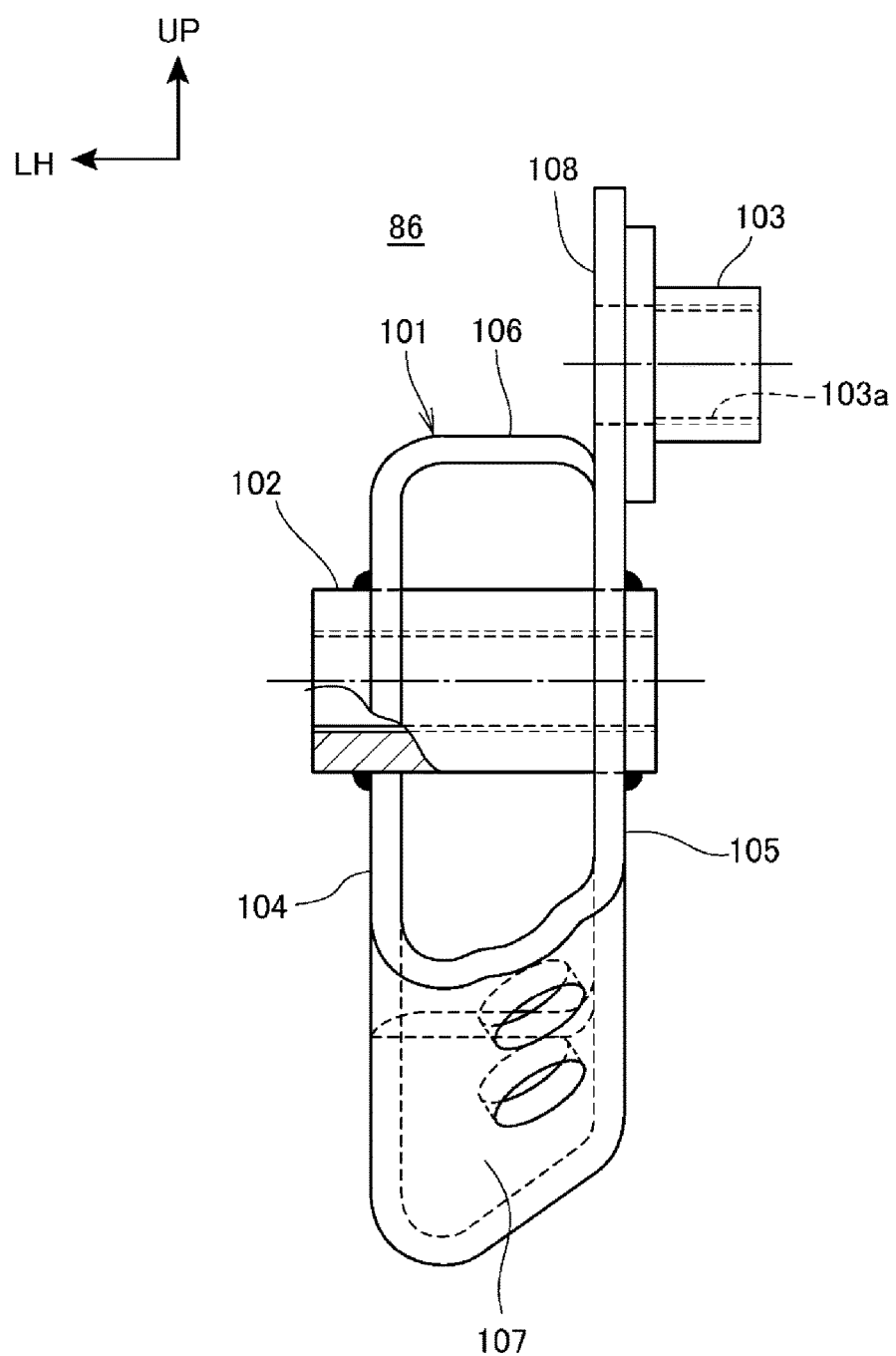
FIG. 11 is a front view of the appendage on one side when viewed from the rear side.

FIG. 10 is a left side view of the appendage 86. FIG. 11 is a front view of the appendage 86 when viewed from behind and looking toward the forward end of the vehicle.

Referring to FIG. 4 and FIGS. 6 to 11, the appendage 86 is provided on or adjacent the end (on the side seat 50L side) of the middle part 88a of the cross member 88. A fixing piece 100 to which the appendage 86 is connected is fixed to the portion of the middle part 88a where the appendage 86 is provided. The fixing piece 100 is formed into a roughly C-shape from a side perspective so as to fit onto the middle part 88a from above and is connected by welding.

The appendage 86 is provided with a bracket 101 (hollow member) connected to the fixing piece 100, a support tube 102 (other nut) to which the buckle 65L, for example, is fixed, and a support tube 103 (one nut) to which the buckle 65M, for example, is fixed.

The bracket 101 is formed into a roughly angular pipe shape by bending a plate material and is provided with an outside wall 104 facing the side seat 50L, an inside wall 105 opposite the outside wall 104 that is positioned further inside than the outside wall 104 in the vehicle width direction, a front wall 106 which links the front edges of the outside wall 104 and the inside wall 105, and a rear wall 107 which links the rear edges of the outside wall 104 and the inside wall 105.

The bracket 101 is disposed at an incline rising upward and backward with respect to the cross member 88 so that the front wall 106 inclines upward and backward from a side perspective. Specifically, the bracket 101 has a notch 101a formed to coincide with the shape of the fixing piece 100 on the front end part in an inclined state and is welded to the fixing piece 100 in a state in which the notch 101a fits onto the rear end of the fixing piece 100. The opening on the front end of the bracket 101 is blocked by the fixing piece 100, but the opening on the rear end opens upward and toward the rear.

As best shown in FIG. 11, a plate 108 extends from the inside wall 105 forward and upward beyond the surface of the front wall 106. Although the plate 108 is shown as being integrally formed with the inside wall 105, it is to be understood that the plate 108 can be formed separately and can be joined to the inside wall 105. The outer end in the axial direction of the support tube 103 is fixed to the inside surface of the plate 108 near the rear end of the bracket 101 by welding, so that the support tube 103 projects inward from the plate 108 in the vehicle width direction. The hole 103a of the support tube 103 passes through the plate 108. The support tube 103 is a nut member provided with a female screw threading to which, for example, the buckle support bolt 74 is fastened from the outside surface of the plate 108 on the inner peripheral part of the hole 103a.

The support 102 is inserted into a through-hole passing through the outside wall 104 and the inside wall 105 of the bracket 101 in the vehicle width direction and is welded to the through-hole. In this way, the outside wall 104 and the inside wall 105 are internally connected by the support 102, so the strength and the rigidity of the bracket 101 is enhanced.

The support 102 is a nut member provided with a female screw threading to which the buckle support bolt 74 (FIG. 5), for example, is fastened on the inner peripheral part. The support 102 is disposed to the outside of the support tube 103 in the vehicle width direction and is disposed below and rearward the support tube 103 so as to be shifted further downward and backward than the support tube 103.

In a non-limiting example, the buckle attachment plate 73L of the buckle 65L is positioned outside of the outside wall 104 of the appendage 86 and is fixed to the appendage 86 when the buckle support bolt 74 is threadingly engaged from the outside in the vehicle width direction with the support 102. The buckle 65L can swing around the buckle support bolt 74.

The buckle attachment plate 73M of the buckle 65M is disposed between the outer side of the plate 108 and the lower part of the buckle 65L above the front wall 106 of the appendage 86 and is fixed to the appendage 86 when the buckle support bolt 74 is threadingly engaged from the outside in the vehicle width direction with the support tube 103. The buckle 65M can swing around the buckle support bolt 74.

That is, the buckles 65L and 65M of the side seat 50L and the middle seat 50M are fixed to a single appendage 86 extending upward and to the rear from the middle part 88a of the cross member 88. As a result, even in a configuration in which the middle part 88a of the cross member 88 is positioned further forward than the support tube 94, it is possible to position the support tube 102 to the rear of the middle part 88a to substantially align the position of the support tube 102 and the support tube 94 in the forward and backward direction as best shown in FIGS. 1 and 6, which improves restraining an occupant with the seat belt device 52L. Further, the two buckles 65L and 65M can be supported with a single appendage 86, which simplifies the structure.

The support tube 102 and the support tube 103 of the appendage 86 are provided at different positions along the length of the vehicle from a side perspective, allowing the positions at which, for example, the buckles 65L and 65M are fixed to be offset from one another along the vehicle length. Therefore, it is possible to avoid the overlapping of the buckles 65L and 65M and to position the buckles 65L and 65M in a space-saving manner.

Further, the buckle attachment plate 73L is disposed to the outside of the outside wall 104, while the buckle attachment plate 73M is disposed between the buckle 65L and the outside wall of the plate 108, to offset the buckle 65L and the buckle 65M at different positions in the vehicle width direction. Therefore, it is possible to avoid the overlapping of the buckles 65L and 65M and to position the buckles 65L and 65M in a space-saving manner. Accordingly, the appendage 86 allows for the buckles 65L and 65M to be offset along the length, width, and height of the vehicle.

The buckle support bolt 74 of the buckle 65L, the buckle support bolt 74 of the buckle 65M, and the anchor support bolt 71 of the anchor 61L are inserted and fastened from the outside (left side) in the vehicle width direction of the one side seat 50L. Therefore, it is possible to fasten the three bolts 74, 74, and 71 from the outside of the side seat 50L without wrapping around to the other side seat 50R side, which simplifies the assembly process.

When the seat belt devices 52L and 52M are fastened and activated causing the belt main units 60L and 60M to be pulled forward, both the outside wall 104 and the inside wall 105 of the appendage 86 are pulled forward via the buckles 65L and 65M. As a result, loads causing the rotation of the appendage 86 when the seat belt devices 52L and 52M are activated counteract one another, so it is possible to prevent a large torsional load from acting on the appendage 86.

Figure 12:
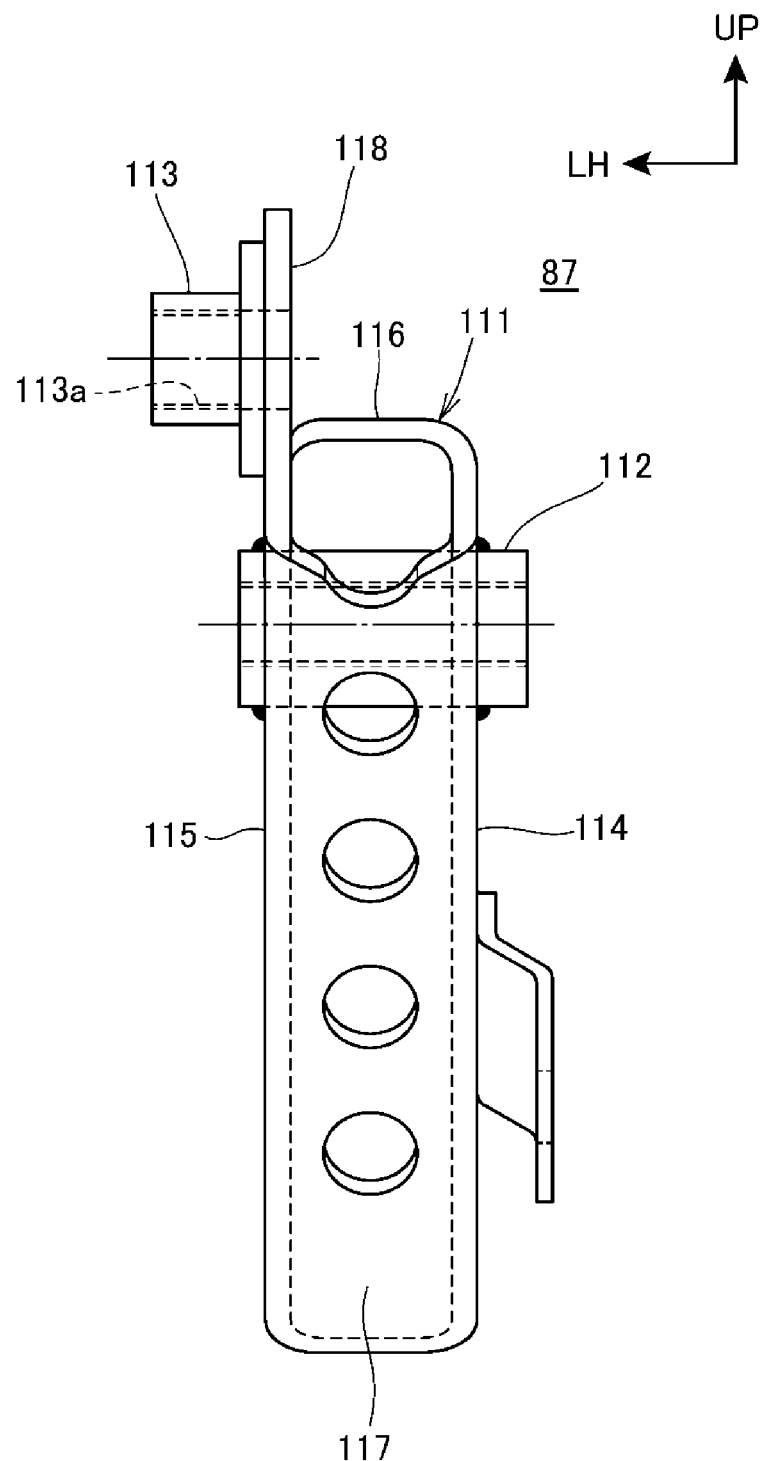
FIG. 12 is a front view of the appendage on the other side when viewed from the rear side.

FIG. 12 is a front view of the other appendage 87 when viewed from the rear. The other appendage 87 is configured with roughly bilateral symmetry to the appendage 86. Referring to FIG. 4, FIGS. 6 to 9 and FIG. 12, the appendage 87 is provided toward the rear of the side seat 50R on the middle part 88a of the cross member 88. A fixing piece 110 to which the appendage 87 is connected is fixed to the middle part 88a. The fixing piece 110 is formed into a roughly C-shape from a side perspective so as to fit onto the angular pipe-shaped middle part 88a from above and connected by welding.

The appendage 87 is provided with a side bracket 111 (hollow member) connected to the fixing piece 110, a support tube 112 (other nut) to which the buckle 65R, for example, is fixed, and a support tube 113 (one nut) to which, for example, the anchor 61M is fixed.

The bracket 111 is formed into a roughly angular pipe shape by bending a plate material and is provided with an outside wall 114 facing the side seat 50R, an inside wall 115 opposite the outside wall 114 that is positioned farther inside than the outside wall 114 in the vehicle width direction, a front wall 116 which links the front edges of the outside wall 114 and the inside wall 115, and a rear wall 117 which links the rear edges of the outside wall 114 and the inside wall 115.

The bracket 111 is disposed at an incline rising upward and backward with respect to the cross member 88 so that the front wall 116 inclines upward and backward from a side perspective. The bracket 111 has a notch 111a formed to coincide with the shape of the fixing piece 110 and is welded to the fixing piece 110 in a state in which the notch part 111a fits onto the rear end of the fixing piece 110. The opening on the front end of the bracket 111 is blocked by the fixing piece 110, but the opening on the rear end opens upward and toward the rear.

A plate 118 is positioned along the inside wall 115 and extends forward and upward beyond the surface of the front wall 116. Although the plate 118 is shown as being integrally formed with the inside wall 115, it is to be understood that the plate 118 can be formed separately and can be joined to the inside wall 115. The support tube 113 is fixed to the inside surface of the plate 118 adjacent the rear part of the bracket 111 by welding, so that the support tube 113 extends inward from the plate 118 in the vehicle width direction. The hole 113a of the support tube 113 passes through the plate 118. The support tube 113 is a nut provided with female threading to which, for example, the anchor support bolt 71 is threadingly engaged from the outside surface of the plate 118 on the inner peripheral part of the hole 113a.

The support tube 112 is inserted into a through-hole passing through the outside wall 114 and the inside wall 115 of the bracket 111 in the vehicle width direction and is welded to both the outside wall 114 and the inside wall 115 defining the through-hole. In this way, the outside wall 114 and the inside wall 115 are internally connected by the support tube 112, so the strength and the rigidity of the support tube 112 are enhanced.

The support tube 112 is a nut member provided with a female screw threading to which the buckle support bolt 74 (FIG. 5), for example, is fastened on the inner peripheral part. The support tube 112 is positioned outside of the support tube 113 in the vehicle width direction and is positioned below the support tube 113 so as to be offset further backward and downward than the support tube 113 with respect to the vehicle length direction.

In a non-limiting example, the buckle attachment plate 73R (FIG. 4) of the buckle 65R is positioned outside (to the right side) of the outside wall 114 of the appendage 87 and is fixed to the appendage 87 when the buckle support bolt 74 is threadingly engaged from the outside in the vehicle width direction in the support tube 112. The buckle 65R can swing around the buckle support bolt 74.

In a non-limiting example, the anchor 61M (FIG. 4) is positioned between the outer side of the plate 118 and the lower part of the buckle 65R above the front wall 116 of the appendage 87 and is fixed to the appendage 87 when the anchor support bolt 71 is threadingly engaged from the outside in the vehicle width direction to the support tube 113. The anchor 61M can swing around the anchor support bolt 71.

That is, the buckle 65R of the side seat 50R and the anchor 61M of the middle seat 50M are fixed to the appendage 87 that extends upward and to the rear from the middle part 88a of the cross member 88. Even though the middle part 88a of the cross member 88 is positioned further forward than the support tube 96, the support tube 112 is positioned toward the rear of the appendage 87 to substantially align the support tube 112 and the support tube 96 in the forward and backward directions, which improves the restraining of an occupant with the seat belt device 52R. Further, the buckle 65R and the anchor 61M can be supported with the appendage 87, which simplifies the structure.

The support tube 113 and the support tube 103 are provided at roughly equivalent positions in the forward and backward directions, an occupant can be held appropriately by the seat belt device 52M. The support tube 113 and the support tube 103 correspond to the middle seat 50M, which bulges further forward and upward than the one side seat 50L and the other side seat 50R, and are disposed further forward and upward than the support tube 102 and the support tube 112.

The support tube 112 and the support tube 113 of the appendage 87 are provided at different positions along the length of the vehicle from a side perspective, so that the positions at which the buckle 65R and the anchor 61M are attached are offset from one another from a side perspective. Therefore, it is possible to avoid the overlapping of the buckle 65R and the anchor 61M along the length of the vehicle and to position the buckle 65R and the anchor 61M in a space-saving manner.

The buckle attachment plate 73R is positioned outside of the outside wall 114, while the anchor 61M is disposed between the buckle 65R and the outside of plate 118, and the anchor 61M and the buckle 65R are disposed at different positions in the vehicle width direction. Therefore, it is possible to offset the anchor 61M and the buckle 65R in the vehicle width direction to position the anchor 61M and the buckle 65R in a space-saving manner.

The buckle support bolt 74 of the buckle 65R, the anchor support bolt 71 of the anchor 61M, and the anchor support bolt 71 of the anchor 61R are inserted and fastened from the outside (right side) in the vehicle width direction of the side seat 50R. Therefore, it is possible to fasten the three bolts 74, 71, and 71 from the outside of the side seat 50R without wrapping around to the one side seat 50L side, which yields good operationality.

When the seat belt devices 52R and 52M are fastened and activated and the belt main units 60R and 60M are pulled forward, both the outside wall 114 and the inside wall 115 of the appendage 87 are pulled forward via the buckle 65R and the anchor 61M. As a result, loads causing the rotation of the appendage 87 when the seat belt devices 52R and 52M are activated counteract one another, so it is possible to prevent a large torsional load from acting on the appendage 87.

The seat cushion 51a is mounted on the seat support frame 81 and is fixed to the seat support frame 81. The backrest 51b is fixed to the front surfaces of the upper cross frame 82 and the vertical connection frame 83. The gap between the rear edge of the seat cushion 51a and the lower edge of the backrest 51b may be covered by a cover 120 attached to the seat frame 25. The cover 120 is provided with a pair of openings 120a on the middle seat 50M side, and the appendage 86 and the appendage 87 extend upward through the openings 120a.

According to an embodiment of the present disclosure, the seat belt attachment structure of the off-road vehicle 10 comprises a seat 6 in which a driver and at least one adjacent occupant can sit, and a seat frame 25 including a part of a vehicle body frame 11 for supporting a seat cushion 51a, a backrest 51b, and seat belt devices 52L, 52M, and 52R for restraining occupants. The seat belt devices 52L, 52M, and 52R are fixed at three points when fastened including retractors 62L, 62M, and 62R that house shoulder belts 67 which are capable of being let out from behind a shoulder on one side of an occupant, anchors 61L, 61M, and 61R for fixing waist belts 66 on the same side as the retractors 62L, 62M, and 62R, and buckles 65L, 65M, and 65R which connect the shoulder belts 67 and the waist belts 66 and with which tongue plates 64L, 64M, and 64R extend to the opposite side detachably engage below the waist on the opposite side as the anchors 61L, 61M, and 61R. The waist belts 66 of the adjacent side seat 50L and the middle seat 50M and the adjacent side seat 50R and the middle seat 50M are respectively fixed to the appendage 86 and the appendage 87 that are disposed between the two seats and extend upward from the seat support 81 of the seat frame 25. In this way, the waist belts 66 are fixed to the appendage 86 and the appendage 87, which extend upward from the seat support 81 of the seat frame 25, so it is possible to extend the appendage 86 and the appendage 87 to a given position at which occupants can be restrained by the belt main units 60L, 60M, and 60R, and the waist belts 66 of two seats can be respectively fixed to the appendage 86 and the appendage 87. Therefore, the belt main units 60L, 60M, and 60R can be attached at any location where occupants can be restrained with a compact and simple structure.

The anchor 61M and the buckle 65R are provided with an attachment plate 70 and a buckle attachment plate 73R attached to the appendage 87, wherein the sitting positions of the occupants of the middle seat 50M and the other side seat 50R in a horizontal row are provided so as to be shifted from one another from a side view of the vehicle, and the attachment plate 70 and the buckle attachment plate 73R are fixed at different positions of the appendage 87 from a side view of the vehicle. Therefore, even in the case of a seat 6 with different occupant sitting positions, the attachment plate 70 of the anchor 61M and the buckle attachment plate 73R can be fixed to a single appendage 87.

In addition, the buckle 65M and the buckle 65L are provided with a buckle attachment plate 73M and a buckle attachment plate 73L attached to the appendage 86, wherein the sitting positions of the occupants of the middle seat 50M and the one side seat 50L in a horizontal row are provided so as to be shifted from one another from a side view of the vehicle, and the buckle attachment plate 73M and the buckle attachment plate 73L are fixed at different positions of the appendage 86 from a side view of the vehicle. Therefore, even in the case of a seat 6 with different occupant sitting positions, the buckle attachment plate 73M and the buckle attachment plate 73L can be appropriately fixed to a single appendage 86. Since the buckle attachment plate 73M and the buckle attachment plate 73L are fixed at different positions from a side view of the vehicle, it is possible to prevent the buckle attachment plate 73M and the buckle attachment plate 73L from obstructing one another, even if they have the same shape, and the buckle attachment plate 73M and the buckle attachment plate 73L can be formed from the same parts.

In an embodiment, the seat 6 is a three-person seat on which three occupants sit in a horizontal row. The appendage 86 and the appendage 87 are respectively provided to the left and right of the middle seat 50M, and an anchor support bolt 71 and a buckle support bolt 74 for fixing the attachment plate 70 of the anchor 61M and the buckle attachment plate 73R are fixed to the appendage 87 on the right side, whereas the buckle support bolts 74 for fixing the buckle attachment plate 73M and the buckle attachment plate 73L are fixed to the appendage 86 on the left side and are fastened from the left side of the vehicle. Therefore, the anchor 61M and the buckle attachment plate 73R of the appendage 87 on the right side can be fastened from the right side of the vehicle, and the buckle attachment plate 73M and the buckle attachment plate 73L of the appendage 86 on the left side can be fastened from the left side of the vehicle. This allows for all of the fasteners to one side of the middle seat 50M to be fastened from that side of the vehicle at a close position without wrapping around, which simplifies assembly of the components.

The appendage 86 may be provided with a bracket 101 having a rectangular cross section from the perspective of the axial direction. In a non-limiting example, the buckle attachment plate 73L of the seat 50L is attached to the outside wall 104 side on one side in the vehicle width direction of the bracket 101 facing the seat 50L, and the buckle attachment plate 73M of the middle seat 50M is attached to the inside wall 105 side (by fixing the buckle attachment plate 73M to the outside wall of the plate part 108) on the other side in the vehicle width direction of the bracket 101 facing the middle seat 50M. Therefore, it is possible to fasten both buckle attachment plates 73L and 73M from the same side of the vehicle, while still allowing for tensile forces acting on the outside wall 104 and the inside wall 105 to counteract the torsional load acting on the bracket 101 when the belt main units 60L and 60R are pulled, which makes it possible to prevent a large torsional load from acting on the bracket 101. Similarly for the other appendage 87, it is possible to use the tensile forces acting on the outside wall 114 and the inside wall 115 to counteract the torsional load applied to the other bracket 111 when the belt main units 60R and 60M are pulled, which makes it possible to prevent a large torsional load from acting on the other bracket 111.

The two nuts including the support tube 103 and the support tube 102 for fixing the buckle attachment plate 73M and the buckle attachment plate 73L are provided on the appendage 86. The support tube 103 is provided on the plate 108 extending directly from the inside wall 105 serving as one side surface in the vehicle width direction of the bracket 101, whereas the support tube 102 passes through the bracket 101 from left to right and is connected to both the left and right outside wall 104 and inside wall 105. As a result, it is possible to shift the positions of the support tube 103 and the support tube 102 in the vehicle width direction, which makes it easy to secure space for attaching the buckle attachment plate 73M and the buckle attachment plate 73L. In addition, the strength and rigidity of the bracket 101 can be enhanced by connecting the support tube 102 to the outside wall 104 and the inside wall 105.

Two nuts including the support tube 113 and the support tube 112 for fixing the attachment plate 70 of the anchor 61M and the buckle attachment plate 73R are provided on the other appendage 87. The support tube 113 is provided on a plate 118 extending directly from the inside wall 115 serving as one side surface in the vehicle width direction of the other bracket 111, whereas the other support tube 112 passes through the other bracket 111 from left to right and is connected to both the left and right inside wall 115 and the outside wall 114. As a result, it is possible to shift the positions of the support tube 113 and the support tube 112 in the vehicle width direction, which makes it easy to secure space for attaching the attachment plate 73 and the buckle attachment plate 73R. In addition, the strength and rigidity of the other bracket 111 can be enhanced by connecting the other support tube 112 to the inside wall 115 and the outside wall 114.

In a non-limiting example, the seat 6 is a three-person seat on which three occupants can sit in a horizontal row. One side surface in the vehicle width direction of the bracket 101 is an inside wall 105 serving as the inside surface in the vehicle width direction. The buckle attachment plate 73L fixed to the support tube 102 is fixed to the outside surface side of the bracket 101, and the buckle attachment plate 73M fixed to the support tube 103 is fixed to the outside surface side of the plate 108. Therefore, it is possible to provide the buckle attachment plate 73M between the outside surface of the plate 108 and the outside surface of the bracket 101 in a space-saving manner, and the buckle attachment plate 73L and the buckle attachment plate 73M can be easily fixed to the appendage 86 from the outside surface side.

Similarly, one side surface in the vehicle width direction of the other bracket 111 is the inside wall 115 serving as the inside surface in the vehicle width direction. The buckle attachment plate 73R fixed to the support tube 112 is fixed to the outside surface side of the bracket 111, and the attachment plate 70 of the anchor 61M fixed to the support tube 113 is fixed to the outside surface side of the plate 118. Therefore, it is possible to provide the attachment plate 70 between the outside surface of the plate 118 and the outside surface of the bracket 111, and the attachment plate 70 and the buckle attachment plate 73R can be easily fixed to the other appendage 87 from the outside surface side.

The embodiment described above illustrates one aspect to which the present disclosure is applied, and the present disclosure is not limited to the embodiment described above.

Although the above embodiment was described as a case in which the seat 6 is a three-person seat on which three occupants sit in a horizontal row, the present disclosure is not limited to this configuration, and the seat may be, for example, a two-person seat not having the other side seat 50R.

What is claimed is:

1. A seat belt attachment structure for an off-road vehicle comprising:
    a seat including a seat frame and at least a first occupant sitting position positioned adjacent a second occupant sitting position, each occupant sitting position having opposing sides;
    a seat belt for each sitting position that is capable of being fastened and unfastened, each seat belt including a shoulder belt, a waist belt, and a tongue plate, wherein each seat belt when fastened is fixed at three points including at a retractor housing the shoulder belt, at an anchor fixing the waist belt on the same side of the sitting position as the retractor, and at a buckle positioned on the other side of the sitting position that detachably engages the tongue plate when the seat belt is fastened; and
    at least a first appendage that extends upward from the seat frame and is positioned along the seat frame in the vehicle width direction between the first and second sitting positions, wherein the tongue plate of the seat belt of the first sitting position and either the tongue plate or the anchor of the seat belt of the second sitting position are attached to the first appendage when the seat belts of the first and second sitting positions are fastened, and wherein the anchor or the buckle of the first sitting position and the anchor or the buckle of the second sitting position are fixed to the first appendage at different positions along the length and the height of the vehicle.

2. The seat belt attachment structure of claim 1, wherein the anchor and the buckle of the second sitting position and at least one of the anchor and the buckle of the first sitting position each includes an attachment plate, wherein the at least first and second sitting positions are aligned in a horizontal row being provided so as to be shifted from one another from a side view of the vehicle, and one of the at least one attachment plate from the first sitting position seat belt and one of the attachment plates from the second sitting position seat belt are fixed to the first appendage at different positions along the length of the vehicle.

3. The seat belt attachment structure of claim 2, wherein the seat includes a third sitting position and the three sitting positions are aligned in a horizontal row with the second sitting position positioned between the first and third sitting positions, the first appendage is positioned to the left of the second sitting position and a second appendage is positioned to the right of the second sitting position along the seat frame in the vehicle width direction between the second and third sitting positions, wherein the other attachment plate for the second sitting position seat belt and an attachment plate for either an anchor or a buckle of a seat belt for the third sitting position are fixed to the second appendage with separate fastening members fastened from the right side of the vehicle, and the attachment plates for the first and second sitting position seat belts that are attached to the first appendage are fixed with separate fasteners from the left side of the vehicle.

4. The seat belt attachment structure of claim 3, wherein the first appendage and the second appendage each includes a hollow member having a rectangular cross section from the perspective of the axial direction, wherein the hollow member of the first appendage includes an outer side facing the first sitting position and an inner side facing the second sitting position and the hollow member of the second appendage includes an outer side facing the third sitting position and an inner side facing the second sitting position, wherein the attachment plate for the first sitting position seat belt that is attached to the first appendage is attached to the outer side of the hollow member of the first appendage and the attachment plate for the third sitting position seat belt that is attached to the second appendage is attached to the outer side of the hollow member of the second appendage, and wherein the attachment plate for the second sitting position seat belt that is attached to the first appendage is attached to the inner side of the hollow member of the first appendage and the other attachment plate of the second sitting position seat belt that is attached to the second appendage is attached to the inner side of the hollow member of the second appendage.

5. The seat belt attachment structure of claim 4, wherein the first and second appendages each includes two nuts for fixing the attachment plates for the seat belts for the adjacent sitting positions, wherein the first nut is provided on a plate that extends outward from the inner side of the hollow member and includes an outer side facing the same direction as the outer side of the hollow member and an inner side facing the same direction as the inner side of the hollow member, wherein the first nut extends outward from the inner side of the plate toward the second sitting position, and wherein the second nut passes through the hollow member and is connected to both the inner and outer sides of the hollow member.

6. The seat belt attachment structure of claim 5, wherein the attachment plate for the first sitting position seat belt that is attached to the first appendage is fixed to the second nut on the outer side of the hollow member of the first appendage and the attachment plate for the third sitting position seat belt that is attached to the second appendage is fixed to the second nut on the outer side of the hollow member of the second appendage, and wherein the attachment plate for the second sitting position seat belt that is attached to the first appendage is fixed to the first nut of the first appendage on the outer side of the plate and the other attachment plate of the second sitting position seat belt that is attached to the second appendage is fixed to the first nut of the second appendage on the outer side of the plate.

7. The seat belt attachment structure of claim 2, wherein the first appendage is provided with a hollow member having a rectangular cross section from the perspective of the axial direction, wherein the hollow member of the first appendage includes a first side facing the first sitting position and a second side facing the second sitting position, wherein the attachment plate for the first sitting position seat belt that is attached to the first appendage is attached to the first side of the hollow member of the first appendage, and the attachment plate of the second sitting position seat belt that is attached to the first appendage is attached to the second side of the hollow member of the first appendage.

8. The seat belt attachment structure of claim 7, wherein two nuts for fixing the attachment plates are provided on the first appendage, wherein the first nut is provided on a plate that extends outward from the second side of the hollow member and includes a first side facing the first seat and a second side facing the second seat, wherein the first nut extends from the second side of the plate toward the second sitting position, and the second nut passes through the hollow member and is connected to both the first and second sides of the hollow member.

9. The seat belt attachment structure of claim 8, wherein the seat is a three-person seat including three sitting positions on which three occupants can sit in a horizontal row, wherein the first side of the hollow member is an outer side in the vehicle width direction and the second side of the hollow member is an inner side in the vehicle width direction, the buckle attachment plate for the seat belt for the first sitting position is fixed to the second nut on the outer side of the hollow member, and the attachment plate for the seat belt for the second sitting position that is attached to the first appendage is fixed to the first nut on the outer side of the plate.

10. A seat belt attachment structure for an off-road vehicle comprising:
    a seat support frame extending along a width of the vehicle;
    a first appendage extending from the support frame that includes an outer side facing away from a longitudinal centerline of the vehicle and an inner side facing toward the centerline;
    a second appendage extending from the support frame that includes an outer side facing away from the centerline and an inner side facing toward the centerline and the inner side of the first appendage;
    a first sitting position positioned along the frame outward from the centerline beyond the first appendage and including a seat belt assembly that includes a belt with two ends, a tongue plate secured to the belt, a retractor secured to one end of the belt, an anchor secured to the other end of the belt and positioned on a first side of the first sitting position, and a buckle positioned on a second side of the first sitting position that is capable of detachably engaging the tongue plate, wherein one of the buckle or the anchor for the first sitting position is fixed to the outer side of the first appendage;
    a second sitting position positioned along the seat support frame adjacent the first seat and between the inner side of the first and second appendages, the second sitting position including a seat belt assembly that includes a belt with two ends, a tongue plate secured to the belt, a retractor secured to one end of the belt, an anchor secured to the other end of the belt and positioned on a first side of the second sitting position, and a buckle positioned on a second side of the second sitting position that is capable of detachably engaging the tongue plate, wherein one of the buckle or the anchor for the second sitting position is fixed to the outer side of the first appendage and the other of the buckle or the anchor is fixed to the outer side of the second appendage; and a third sitting position positioned along the frame adjacent the second sitting position and outward from the centerline beyond the second appendage, the second sitting position is positioned between the first and third sitting positions, the third sitting position including a seat belt assembly that includes a belt with two ends, a tongue plate secured to the belt, a refractor secured to one end of the belt, an anchor secured to the other end of the belt and positioned on a first side of the third sitting position, and a buckle positioned on a second side of the third sitting position that is capable of detachably engaging the tongue plate, wherein one of the buckle or the anchor for the third sitting position is fixed to the outer side of the second appendage.

11. The seat belt attachment structure of claim 10, wherein the buckle or the anchor for the first sitting position that is fixed to the first appendage is fixed at a first position and the buckle or the anchor for the second sitting position that is fixed to the first appendage is fixed at a second position that is forwardly offset, upwardly offset, or forwardly and upwardly offset from the first position, and wherein the buckle or the anchor for the third sitting position that is fixed to the outer side of the second appendage is fixed at a third position and the other of the buckle or the anchor of the second seat that is fixed to the second appendage is fixed at a fourth position that is forwardly offset, upwardly offset, or forwardly and upwardly offset from the third position.

12. The seat belt attachment structure of claim 11, wherein the second position is positioned closer to the centerline than the first position, and wherein the fourth position is positioned closer to the centerline than the third position.

13. The seat belt attachment structure of claim 12, wherein the first appendage includes a hollow member extending upward and rearward from the frame and a plate extending upward and forward from the hollow member, wherein an outer surface of the hollow member and an outer surface of the plate at least partially define the outer side of the first appendage, wherein the first position is on the outer surface of the hollow member and the second position is on the outer surface of the plate, and wherein the second appendage includes a hollow member extending upward and rearward from the frame and a plate extending upward and forward from the hollow member, wherein an outer surface of the hollow member and an outer surface of the plate of the second appendage at least partially define the outer side of the second appendage, wherein the third position is on the outer surface of the hollow member of the second appendage and the fourth position is on the outer surface of the plate of the second appendage.

14. The seat belt attachment structure of claim 12, further comprising: a seat back including portions positioned behind the first, second, and third sitting positions, the seat back portion positioned behind the second sitting position is positioned closer to the front end of the vehicle than the seat back portions positioned behind the first and third sitting positions, wherein the seat support frame includes a first column, a second column and a cross member secured to the first and second columns, wherein the cross member includes a center portion, a first leg, and a second leg, wherein the center portion includes a length extending in the width direction of the vehicle and is positioned underneath the second sitting position, wherein the first leg is positioned under the first sitting position and extends rearward from the center portion to the first column, wherein the second leg is positioned under the third sitting position and extends rearward from the center portion to the second column, wherein the first appendage and the second appendage are secured to the center portion and extend upward and rearward therefrom, wherein a third appendage is secured to the first leg outward from the centerline beyond the first appendage, and a fourth appendage is secured to the second leg outward from the centerline beyond the second appendage, wherein the anchor of the first sitting position is fixed at a fifth position to an outer side of the third appendage facing away from the centerline and the anchor of the third sitting position is fixed at a sixth position to an outer side of the fourth appendage facing away from the centerline, and wherein the fifth position is substantially aligned with the first position, and the sixth position is substantially aligned with the third position.

15. The seat belt attachment structure of claim 10, wherein the buckle of the first seat is fixed to the first appendage, the buckle of the second seat is fixed to first appendage, the anchor of the second seat is fixed to the second appendage, and the buckle of the third seat is fixed to the second appendage.

16. A seat belt attachment structure for an off-road vehicle comprising:
a seat support frame extending along the width of the vehicle;
a first appendage extending from the frame;
a second appendage extending from the frame; a first sitting position positioned beside the first appendage and including a seat belt assembly that includes a belt with two ends, a tongue plate secured to the belt, a refractor secured to one end of the belt, an anchor secured to the other end of the belt and positioned on a first side of the first sitting position, and a buckle positioned on a second side of the first sitting position that is capable of detachably engaging the tongue plate, wherein one of the buckle or the anchor of the first sitting position is fixed to the first appendage;
a second sitting position positioned along the frame beside the first sitting position and between the first appendage and the second appendage, the second sitting position including a seat belt assembly that includes a belt with two ends, a tongue plate secured to the belt, a retractor secured to one end of the belt, an anchor secured to the other end of the belt and positioned on a first side of the second sitting position, and a buckle positioned on a second side of the second sitting position that is capable of detachably engaging the tongue plate, wherein one of the buckle or the anchor of the second sitting position is fixed to the first appendage and the other of the buckle or the anchor of the second sitting position is fixed to the second appendage;
a third sitting position positioned along the frame beside the second sitting position, the second sitting position is positioned between the first and third sitting positions, the second appendage is positioned along the frame between the second sitting position and the third sitting position, the third sitting position including a seat belt assembly that includes a belt with two ends, a tongue plate secured to the belt, a retractor secured to an end of the belt, an anchor secured to the other end of the belt and positioned on a first side of the third sitting position, and a buckle positioned on a second side of the third sitting position that is capable of detachably engaging the tongue plate, wherein one of the buckle or the anchor of the third sitting position is fixed to the second appendage; and a seat back including portions positioned behind the first, the second, and the third sitting positions, wherein the portion of the seat back positioned behind the second sitting position is positioned closer to a front end of the vehicle than the other portions of the seat back positioned behind the first and the third sitting positions.

17. The seat belt attachment structure of claim 16, wherein the buckle or the anchor of the first sitting position that is fixed to the first appendage is fixed at a first position on the first appendage and the buckle or the anchor of the second sitting position that is fixed to the first appendage is fixed at a second position on the first appendage that is positioned forward and upward from the first position, and wherein the buckle or the anchor of the third sitting position that is fixed to the second appendage is fixed at a third position on the second appendage and the other of the buckle or the anchor of the second sitting position that is fixed to the second appendage is fixed at a fourth position on the second appendage that is positioned forward and upward from the third position.

18. The seat belt attachment structure of claim 17, wherein the seat support frame includes: a first column; a second column; and a cross member secured to the first and second columns and including: a center portion having a length extending in the width direction of the vehicle, the center portion is positioned underneath the second sitting position, a first leg positioned under the first sitting position that extends rearward from the center portion to the first column, and a second leg positioned under the third sitting position that extends from the center portion to the second column, wherein the first appendage and the second appendage each includes a hollow member extending upward and rearward from the center portion and a plate including a portion extending upwardly and forwardly from the hollow member, wherein the first position is on the hollow member of the first appendage and the second position is on the plate of the first appendage, and wherein the third position is on the hollow member of the second appendage and the fourth position is on the plate of the second appendage.

19. The seat belt attachment structure of claim 17, further comprising: a first column; a second column; and a cross member secured to the first and second columns and including: a center portion having a length extending in the width direction of the vehicle, the center portion is positioned underneath the second sitting position, a first leg positioned under the first sitting position that extends rearward from the center portion to the first column, and a second leg positioned under the third sitting position that extends rearward from the center portion to the second column, wherein the first appendage and the second appendage are secured to the center portion and extend upward and rearward therefrom, wherein a third appendage is secured to the first leg and a fourth appendage is secured to the second leg, wherein the anchor of the first sitting position is fixed to the third appendage at a fifth position and the anchor of the third sitting position is secured to the fourth appendage at a sixth position, and wherein the fifth position is substantially aligned with the first position and the sixth position is substantially aligned with the third position.

20. The seat belt attachment structure of claim 16, wherein the buckle of the first seat is fixed to the first appendage, the buckle of the second seat is fixed to the first appendage, the anchor of the second seat is fixed to the second appendage, and the buckle of the third seat is fixed to the second appendage.

21. A seat belt attachment structure for an off-road vehicle comprising:

a seat including a seat frame, a seat back, and at least a first occupant sitting position positioned adjacent a second occupant sitting position, each occupant sitting position having opposing sides;

a seat belt for each sitting position that is capable of being fastened and unfastened, each seat belt including a shoulder belt, a waist belt, and a tongue plate, wherein each seat belt when fastened is fixed at three points including at a retractor housing the shoulder belt, at an anchor fixing the waist belt on the same side of the sitting position as the retractor, and at a buckle positioned on the other side of the sitting position that detachably engages the tongue plate when the seat belt is fastened; and at least a first appendage that extends upward from the seat frame and is positioned along the seat frame in the vehicle width direction between the first and second sitting positions and forward of the seat back, wherein the anchor or the buckle of the first sitting position and the anchor or the buckle of the second sitting position are fixed to the first appendage at different positions along the height of the vehicle, and wherein the seat belts of the first and second sitting positions are attached to the first appendage when the seat belts of the first and second sitting positions are fastened.

* * * * *